(12) United States Patent
Semba et al.

(10) Patent No.: US 9,187,890 B2
(45) Date of Patent: Nov. 17, 2015

(54) SEPARATOR AND SEPARATION METHOD

(75) Inventors: Fujio Semba, Tokyo (JP); Satoshi Ohhira, Tokyo (JP); Takuo Shioya, Tokyo (JP); Atsushi Tsunoda, Tokyo (JP)

(73) Assignee: HANEX CO., LTD., Tokyo (JP)

( * ) Notice: Subject to any disclaimer, the term of this patent is extended or adjusted under 35 U.S.C. 154(b) by 898 days.

(21) Appl. No.: 12/867,913

(22) PCT Filed: Feb. 17, 2009

(86) PCT No.: PCT/JP2009/052621
§ 371 (c)(1),
(2), (4) Date: Sep. 9, 2010

(87) PCT Pub. No.: WO2009/104572
PCT Pub. Date: Aug. 27, 2009

(65) Prior Publication Data
US 2011/0000862 A1    Jan. 6, 2011

(30) Foreign Application Priority Data
Feb. 19, 2008   (JP) ................................ P2008-037163

(51) Int. Cl.
*B01D 29/01* (2006.01)
*E03F 5/14* (2006.01)
*B01D 29/03* (2006.01)
*B01D 29/31* (2006.01)

(52) U.S. Cl.
CPC . *E03F 5/14* (2013.01); *B01D 29/03* (2013.01); *B01D 29/31* (2013.01); *B01D 2201/02* (2013.01)

(58) Field of Classification Search
None
See application file for complete search history.

(56) References Cited

U.S. PATENT DOCUMENTS

| | | | | | |
|---|---|---|---|---|---|
| 1,880,273 | A | * | 10/1932 | Pardee et al. | ............... 34/58 |
| 2,672,982 | A | * | 3/1954 | Way | ............... 210/155 |
| 4,092,249 | A | | 5/1978 | La Gatta | |
| 4,139,471 | A | * | 2/1979 | Foti | ............... 210/170.06 |
| 4,221,667 | A | * | 9/1980 | Suhrheinrich | ............... 210/304 |
| 4,529,518 | A | | 7/1985 | Jackson | ............... 210/407 |
| 4,956,101 | A | * | 9/1990 | Holmberg | ............... 210/780 |
| 4,957,633 | A | * | 9/1990 | Suutarinen | ............... 210/705 |
| 5,034,122 | A | * | 7/1991 | Wiesemann | ............... 210/162 |

(Continued)

FOREIGN PATENT DOCUMENTS

| | | |
|---|---|---|
| AU | 726262 B2 | 11/2000 |
| CN | 1067826 A | 1/1993 |

(Continued)

*Primary Examiner* — Robert James Popovics
(74) *Attorney, Agent, or Firm* — Drinker Biddle & Reath LLP

(57) ABSTRACT

A problem is to solve problems on removal of solids by a screen and on an installation space and pipe connection in a separator. A solution to the problem is as follows. A separator 1, which is a device for separating solids contained in influent liquid, has a separation tank 2; a partition plate 5 partitioning an inside space of the separation tank 2 into an inflow chamber 3 and an outflow chamber 4; a screen 8 provided at the partition plate 5; a liquid inlet 6 formed at the inflow chamber 3; and a discharge outlet 7 formed at the outflow chamber 4; the inflow chamber 3 is provided with a guide unit 9, 10, 10*a* for forming a vertical swirling flow in the inflow chamber 3 by reversing the influent liquid from the liquid inlet 6; the screen 8 is disposed along a side face of the swirling flow thus formed. This configuration permits the solids to be removed, without clogging the screen with the solids.

8 Claims, 12 Drawing Sheets

(56) References Cited

U.S. PATENT DOCUMENTS

| | | | |
|---|---|---|---|
| 5,543,038 A * | 8/1996 | Johannessen | 210/117 |
| 5,565,103 A * | 10/1996 | Eto | 210/601 |
| 5,770,057 A * | 6/1998 | Filion | 210/162 |
| 5,779,888 A * | 7/1998 | Bennett | 210/162 |
| 5,788,848 A * | 8/1998 | Blanche et al. | 210/162 |
| 5,814,216 A * | 9/1998 | Filion | 210/154 |
| 5,840,180 A * | 11/1998 | Filion | 210/162 |
| 6,086,756 A * | 7/2000 | Roy | 210/155 |
| 6,183,633 B1 * | 2/2001 | Phillips | 210/170.03 |
| 6,241,881 B1 * | 6/2001 | Pezzaniti | 210/155 |
| 6,270,663 B1 * | 8/2001 | Happel | 210/163 |
| 6,287,459 B1 * | 9/2001 | Williamson | 210/99 |
| 6,337,016 B1 * | 1/2002 | Alper | 210/265 |
| 6,379,541 B1 * | 4/2002 | Nicholas | 210/155 |
| 6,464,862 B2 * | 10/2002 | Bennett | 210/155 |
| 6,478,954 B1 * | 11/2002 | Turner et al. | 210/162 |
| 6,511,595 B2 * | 1/2003 | Crompton et al. | 210/162 |
| 6,641,720 B1 * | 11/2003 | Crompton et al. | 210/155 |
| 6,651,825 B2 * | 11/2003 | Turner et al. | 210/483 |
| 6,679,994 B1 * | 1/2004 | Turco et al. | 210/767 |
| 6,866,153 B2 * | 3/2005 | Turner et al. | 210/483 |
| 6,868,971 B2 * | 3/2005 | Phillips | 209/17 |
| 6,953,524 B2 * | 10/2005 | Woodbridge et al. | 210/97 |
| 6,953,529 B2 * | 10/2005 | Weir | 210/791 |
| 7,083,721 B2 * | 8/2006 | McClure et al. | 210/155 |
| 7,138,048 B1 * | 11/2006 | O'Connor et al. | 210/136 |
| 7,258,785 B2 * | 8/2007 | Weir et al. | 210/163 |
| 7,441,661 B2 * | 10/2008 | Phillips | 209/156 |
| 7,465,391 B2 * | 12/2008 | Heist et al. | 210/162 |
| 7,883,620 B2 * | 2/2011 | Owen | 210/86 |
| 8,034,234 B2 * | 10/2011 | Happel | 210/121 |
| 2001/0040124 A1 * | 11/2001 | Bennett | 210/155 |
| 2004/0226869 A1 * | 11/2004 | McClure et al. | 210/163 |
| 2006/0163130 A1 * | 7/2006 | Happel et al. | 210/163 |
| 2007/0056889 A1 * | 3/2007 | Heist et al. | 210/162 |
| 2010/0032363 A1 * | 2/2010 | Happel | 210/242.1 |
| 2011/0000862 A1 * | 1/2011 | Semba et al. | 210/787 |

FOREIGN PATENT DOCUMENTS

| | | |
|---|---|---|
| CN | 1092335 A | 9/1994 |
| CN | 1120817 A | 4/1996 |
| CN | 2707347 Y | 7/2005 |
| EP | 1 369 156 A1 | 12/2003 |
| JP | 60-28048 | 2/1985 |
| JP | 6-319909 | 11/1994 |
| JP | 8-141326 | 6/1996 |
| JP | 9-299974 | 11/1997 |
| JP | 2000-140518 | 5/2000 |
| WO | WO-94/17896 A1 | 8/1994 |
| WO | 02/060554 | 8/2002 |

* cited by examiner (a)

(b)

(a)

(b)

(a)

(b)

(a)

(b)

(a)

(b)

SEPARATOR AND SEPARATION METHOD

TECHNICAL FIELD

The present invention relates to a device and separation method for separating solids contained in drainage water flowing through sewerage pipes or in liquid circulating through an in-plant wastewater treatment facility or the like.

BACKGROUND ART

Of drainage water such as rainwater flowing into a sewerage system laid in an urban area, part is stored in or discharged into the earth by facilities for storing or infiltrating rainwater, while the rest is discharged to rivers. Solids such as sediment, a variety of garbage, papers, and fallen leaves are mixed in the rainwater drainage flowing in the sewerage system after dropping onto the ground surface and flowing on the ground surface, and if those solids are discharged to the rivers, they will cause water contamination; if they flow into the rainwater storing-infiltrating facilities, it will become necessary to frequently perform maintenance of the facilities; therefore, they will cause disadvantage in terms of cost. Furthermore, rainwater is temporarily stored underground without removal of solids in a rainwater storage tank or the like for flood countermeasures against torrential rain, and the stored rainwater needs to be pumped up during fine weather to be discharged to a river; on that occasion, however, the solids are also simultaneously discharged to the river, so as to cause the river water contamination and environment pollution problem. As means to avoid the water contamination and environment pollution, a separator of drainage water to separate the solids is provided in part of the sewerage system.

It is common practice to use a screen or a filter as a device for separating and removing the solids in drainage water, but they are likely to be clogged by solids, to cause a maintenance problem thereof. A solution to this problem is a separator configured to generate a horizontal swirling flow (swirl) by energy of the drainage water influent into a separation tank, without use of power such as electricity, and to separate the solids by the swirling flow, and the known separator of this type is, for example, trade name FliudSep available from UFT Inc., Germany. However, while the separator permits easy maintenance because of no use of the filter or screen, it is difficult for the separator to perform secure separation and capture of floating and fine solids of size to be removed.

On the other hand, Patent Literature 1 describes a separator as a combination of the swirling flow generating method and the screen separation method. The separation tank in Patent Literature 1 is configured as follows: a cylindrical screen is disposed in the lower part of the separation tank with a circular plane cross section, drainage water is supplied in a tangent direction from the upper part of the separation tank to generate a swirling flow in the tank, solids are separated by the screen disposed in the lower part, and only the drainage water is made to pass to the outside of the screen.

Patent Literature 1: Japanese Patent Application Laid-open No. 8-141326

SUMMARY OF INVENTION

Problem to be Solved by the Invention

In the case of the conventional separator as the combination of the swirling flow generating method and the screen separation method, however, a drainage supply pipe needs to be connected in the tangent direction to the circular peripheral wall of the separation tank and it is thus necessary to perform processing of a hole for connection at an accurate angle in the peripheral wall. In addition, the cylindrical screen is complex in structure and poses a problem of increase in cost.

Since the foregoing separator has the structure to generate the horizontal swirling flow, it requires a large installation area in a transverse direction perpendicular to a pipe direction. In general, when the separator is installed in the middle of the sewerage system, a drainage water line along a street, or the like, or when the separator is installed in the middle of a pipe line such as a drainage water line provided along a passage in a plant or the like, there is a sufficient room for the installation space along the pipe line direction, but it is often the case that the installation space in the transverse direction perpendicular thereto is limited. For this reason, the aforementioned conventional separator has great restrictions on selection of the installation place.

Therefore, the present invention has been accomplished in order to solve the problem in use of the screen and the problems about the installation space and pipe connection in the conventional separators, and it is an object of the present invention to provide a novel separator and separation method as a solution thereto.

Means for Solving the Problem

A first separator according to the present invention to accomplish the above object is a device for separating solids contained in influent liquid, and the separator comprises a separation tank; a partition plate partitioning an inside space of the separation tank into an inflow chamber and an outflow chamber; a screen provided at the partition plate; a liquid inlet formed at the inflow chamber; and a discharge outlet formed at the outflow chamber, wherein the inflow chamber is provided with a guide unit for forming a vertical swirling flow in the inflow chamber by reversing the influent liquid from the liquid inlet, and wherein the screen is disposed along a side face of the swirling flow thus formed.

A second separator is the first separator wherein the separation tank is formed with a plane cross section of a rectangular shape or an elliptical shape having a longitudinal axis and a transverse axis, or a rectangular-circular shape rectangular on the liquid inlet side and circular on the discharge outlet side, wherein the partition plate is disposed so as to be parallel to or biased from a longitudinal direction, wherein the liquid inlet at the inflow chamber is formed at one longitudinal end, and wherein the discharge outlet at the outflow chamber is formed at the other longitudinal end.

A third separator is the second separator wherein the screen comprises two screens and wherein the screens are provided so that they are parallel to each other or so that a distance between them decreases with distance from the liquid inlet.

A fourth separator is any one of the first to third separators wherein the screen is composed of a wedge wire screen in which a plurality of wedge wires with a wedge-shaped cross section are arranged in a vertical direction and wherein a part of an inner surface of the inflow chamber is composed of heads of the respective wedge wires.

A fifth separator is the fourth separator wherein axis lines extending from the heads of the respective wedge wires toward distal ends thereof are inclined toward a downstream side of the formed vertical swirling flow and wherein the axis lines are inclined in opposite directions to each other according to upper and lower flows of the vertical swirling flow.

A sixth separator is any one of the first to fifth separators wherein a solid discharge outlet is provided at a bottom of the inflow chamber.

A seventh separator is any one of the first to sixth separators wherein a drain outlet is provided at a bottom of the outflow chamber.

An eighth separator is any one of the first to fifth separators wherein the liquid inlet is formed at an upper portion of the inflow chamber, wherein the guide unit is provided at a portion where the swirling flow ascends from a lower portion in the inflow chamber toward the liquid inlet, and wherein a gap is provided between an end of the guide unit and a peripheral wall on which the swirling flow ascends.

A ninth separator is any one of the first to eighth separators wherein an overflow section to establish communication between the inflow chamber and the outflow chamber is provided at an upper portion of the partition plate and wherein the discharge outlet is provided with a weir to prevent oil or floating solids from flowing thereinto.

A tenth separator according to the present invention is a device for separating solids contained in influent liquid, and the separator comprises a separation tank; a partition plate partitioning an inside space of the separation tank into an inflow chamber and an outflow chamber; a screen provided at the partition plate; a dividing body dividing the inflow chamber into an upper first chamber and a lower second chamber; an opening part formed at the dividing body; a supply part formed at the first chamber; and a discharge outlet formed at the outflow chamber, wherein the first chamber is provided with a guide unit to generate a vertical swirling flow in the first chamber by reversing an influent direction of the influent liquid from the supply part, wherein the screen is disposed along a side face of the vertical swirling flow formed in the first chamber and a lower edge thereof extends at least to the dividing body, and wherein a deposition section for solids influent through the opening part is formed at the second chamber.

A first separation method according to the present invention is a method for separating solids contained in influent liquid, and the separation method comprises: by means of a separator comprising a separation tank, a partition plate partitioning an inside space of the separation tank into an inflow chamber and an outflow chamber, a screen provided at the partition plate, a liquid inlet formed at the inflow chamber, and a discharge outlet formed at the outflow chamber, forming a vertical swirling flow in the inflow chamber by reversing the liquid influent from the liquid inlet; and separating solids by the screen disposed along a side face of the swirling flow thus formed.

A second separation method is the first separation method wherein the screen is composed of a wedge wire screen in which a plurality of wedge wires with a wedge-shaped cross section are arranged in a vertical direction, wherein a part of an inner surface of the inflow chamber is composed of heads of the respective wedge wires, and wherein axis lines extending from the heads of the respective wedge wires toward distal ends thereof are inclined toward a downstream side of the formed vertical swirling flow.

A third separation method is the second separation method wherein an average particle diameter of the solids to be separated is in the range of 10 μm to 1 mm.

Effects of the Invention

The first separator of the present invention is characterized in that the inflow chamber is provided with the guide unit for forming the vertical swirling flow in the inflow chamber by reversing the influent liquid from the liquid inlet (e.g., sewage water flowing through a sewerage pipe, discharge water from a paper mill or the like, effluent from a brewery or the like, and so on, which will be referred to hereinafter as "flowing liquid") and in that the screen is disposed along the side face of the swirling flow formed. By adopting the system of forming the vertical swirling flow in this manner, the screen is arranged along the side face of the swirling flow generated in the vertical direction and therefore the solids, together with the flowing liquid, flow approximately in parallel along the screen; consequently, even if the solids attach to the screen, they will be readily swept off by the swirling flow, so as not to cause clogging. If the area of the screen needs to be increased in order to enhance its processing performance of separation, the length of the screen can be increased in the pipe direction and thus there is no need for a large installation area in the transverse direction perpendicular to the pipe direction.

Furthermore, a line such as a pipe to be connected to the liquid inlet can be connected in a normal direction to a surface of the peripheral wall of the separation tank, so as to obtain a connection structure easy in construction such as pipe connection and design thereof and resistant to leakage.

The second separator can be configured as the first separator wherein the separation tank is formed with the plane cross section of the rectangular shape or the elliptical shape having the longitudinal axis and the transverse axis, or the rectangular-circular shape rectangular on the liquid inlet side and circular on the discharge outlet side, wherein the partition plate is provided so as to be parallel to or biased from the longitudinal direction, wherein the liquid inlet at the inflow chamber is formed at one longitudinal end, and wherein the discharge outlet at the outflow chamber is formed at the other longitudinal end. This configuration permits easy increase in the processing performance of separation by increase in the length of the screen in the pipe direction.

The third separator can be configured as the second separator wherein when the separation tank is formed with the plane cross section of the rectangular shape or the elliptical shape having the longitudinal axis and transverse axis, the screen consists of two screens and the two screens are provided so that they are parallel to each other or so that the distance between them decreases with distance from the liquid inlet. This configuration permits the processing performance of separation to be nearly doubled, when compared with the single screen case, without increase in the size of the separation tank, and arranges the flow center of the flowing liquid in the central part in the longitudinal direction to allow the vertical swirling flow to more readily separate the solids, without deviation of the solids in the flowing liquid to one screen.

The fourth separator can be configured as any one of the first to third separators wherein the screen used is the wedge wire screen in which the plurality of wedge wires of the wedge-shaped cross section are arranged in the vertical direction, so as to compose a part of the inner surface of the inflow chamber of the heads of the respective wedge wires.

The use of this wedge wire screen allows efficient separation of fine solids as well. Since the separator is configured so that the surface of the inflow chamber is composed of the heads of the respective wedge wires constituting the wedge wire screen and so that the array shape of the heads is arranged to form a horizontal swirling flow in the flowing liquid supplied from the supply part, even fine solids attaching to the wedge wire screen are readily peeled off by the swirling flow. For this reason, the wedge wire screen can be operated in a clogging-resistant state.

The fifth separator can be configured as the fourth separator using the foregoing wedge wire screen, in which the axis lines from the heads of the respective wedge wires toward the distal ends thereof can be inclined toward the downstream side of the formed vertical swirling flow and in which the axis lines from the heads of the respective wedge wires toward the distal ends can be inclined in the opposite directions to each other according to the upper flow and the lower flow of the vertical swirling flow. This configuration maximizes the Coanda effect and allows high liquid passage efficiency to be maintained, even in the screen part disposed along any side face of the vertical swirling flow.

Furthermore, since the axis lines from the heads of the respective wedge wires toward the distal ends are inclined toward the downstream side of the formed swirling flow, the ends of the heads on the upstream side of the swirling flow project into the inside of the inflow chamber more than the ends of the heads on the downstream side. For this reason, the swirling flow collides with the projecting ends whereby the flowing liquid is efficiently pulled into slits by the Coanda effect, so as to substantially increase the aperture ratio of the screen. Therefore, even if the porosity of the screen becomes very small because of decrease in gaps of slits to allow for separation of solids of about several micrometers to several ten micrometers, the area of the screen can be kept small because of the high liquid passage efficiency, which can achieve further compactification of the device.

The sixth separator can be configured as any one of the first to fifth separators wherein the solid discharge outlet is provided at the bottom of the inflow chamber. This configuration is effectively applicable, for example, to the case where the separator is installed on the ground, and in that case, the solids accumulated on the inflow chamber side can be discharged from the solid discharge outlet to the outside on an as-needed basis.

The seventh separator can be configured as any one of the first to sixth separators wherein the drain outlet is provided at the bottom of the outflow chamber. This configuration is effectively applicable, for example, to the case where the separator is installed on the ground, and in that case, on the occasion of suspending the operation of the separation tank and cleaning the inside space of the inflow chamber with the solids accumulated, the drainage water containing the solids retained in the inflow chamber is discharged through the screen to the outflow chamber side upon opening of the drain outlet and therefore the drainage liquid can be discharged to the outside in a state in which the solids to be separated are removed.

The eighth separator can be configured as any one of the first to fifth separators wherein the liquid inlet is formed at the upper portion of the inflow chamber, wherein the guide unit is provided in the portion on which the swirling flow ascends from the lower part in the inflow chamber toward the liquid inlet, and wherein the gap is provided between the end of the guide unit and the peripheral wall on which the swirling flow ascends.

When the gap is provided between the end of the guide unit and the peripheral wall on which the swirling flow ascends as described above, most of the ascending swirling flow ascends along the guide unit, but part thereof close to the peripheral wall is pushed toward the peripheral wall on the guide unit to decrease its flow rate. When solids with relatively large specific gravity out of those floating and circulating in the swirling flow enter the flow rate decreased region, they will lose their ascending force to drop downward through the gap. For this reason, the solids can be accumulated in a region below the gap and can be taken out from the region to the outside on an as-needed basis.

The ninth separator can be configured as any one of the first to eighth separators wherein the overflow section to establish communication between the inflow chamber and the outflow chamber is provided at the upper portion of the partition plate and wherein the discharge outlet is provided with the weir to prevent oil or floating solids from flowing thereinto. When the overflow section of this configuration is provided and when a heavy rain or the like causes oil and floating solids, together with a large amount of flowing liquid, to flow into the inflow chamber, the oil and floating solids, together with the flowing liquid failing to pass through the screen, can be made to overflow into the outflow chamber. Furthermore, since the discharge outlet is provided with the weir to prevent the oil or floating solids from flowing thereinto, the oil or floating solids overflowing into the outflow chamber can be prevented from being discharged through the discharge outlet to the downstream side.

The tenth separator of the present invention comprises the separation tank, the partition plate partitioning the inside space of the separation tank into the inflow chamber and the outflow chamber, the screen provided at the partition plate, the dividing body dividing the inflow chamber into the upper first chamber and the lower second chamber, the opening part formed at the dividing body, the supply part formed at the first chamber, and the discharge outlet formed at the outflow chamber. When the separator is configured in this manner, the solids separated in the first chamber are guided through the opening part formed at the dividing body, to the second chamber to drop (or be discharged) and since on that occasion there is no other substantial force to again raise the solids in the second chamber, there is no possibility that the solids ascend through the opening part and return to the first chamber which is the major part to separate the solids. This decreases the percentage of solids separated by the screen, staying while entrained on the swirling flow for a long time inside the first chamber, and as a result, it also largely decreases a possibility that the separated solids again attach to the surface of the screen in the first chamber.

The first separation method of the present invention uses the above-described separator to form the vertical swirling flow in the inflow chamber by reversing the flowing liquid influent from the liquid inlet, and to separate the solids by the screen disposed along the side face of the formed swirling flow. In the separation method of the present invention, since the screen is disposed along the side face of the swirling flow generated vertically, the solids, together with the flowing liquid, flow in parallel along the screen surface, the solids are thus less likely to attach to the screen, so as not to cause clogging, and the solids contained in the flowing liquid can be efficiently separated, without need for a large installation area in the transverse direction perpendicular to the pipe direction.

The second separation method can be the first separation method wherein the screen used is composed of a wedge wire screen in which a plurality of wedge wires of the wedge-shaped cross section are arranged in the vertical direction, wherein a part of the inner surface of the inflow chamber is composed of the heads of the respective wedge wires, and wherein the axis lines from the heads of the respective wedge wires toward the distal ends thereof are inclined toward the downstream side of the formed vertical swirling flow.

The use of this wedge wire screen permits efficient separation of fine solids as well. Since the separator is configured so that the surface of the inflow chamber is composed of the heads of the respective wedge wires constituting the wedge wire screen and so that the array shape of the heads is arranged to form a horizontal swirling flow in the flowing liquid supplied from the supply part, even fine solids attaching to the wedge wire screen are readily peeled off by the swirling flow. For this reason, the wedge wire screen can be operated in a clogging-resistant state.

Furthermore, since the axis lines from the heads of the respective wedge wires toward the distal ends are inclined toward the downstream side of the formed swirling flow, the ends of the heads on the upstream side of the swirling flow project into the inside of the inflow chamber more than the ends of the heads on the downstream side. For this reason, the swirling flow collides with the projecting ends whereby the flowing liquid is efficiently pulled into slits by the Coanda effect, so as to substantially increase the aperture ratio of the screen. Therefore, the liquid passage efficiency can be increased even if the gaps of the solids are decreased so as to enable separation of the solids of about several micrometers to several ten micrometers.

There are many cases where the separator of a membrane system using fiber or the like is employed in order to separate and remove fine solids of micrometer order, and it has a problem, particularly, in terms of strength; whereas the wedge wire screen used in the separator of the present invention can be one made of stainless steel or resin, so as to drastically resolve the problem of strength.

Figure 1:
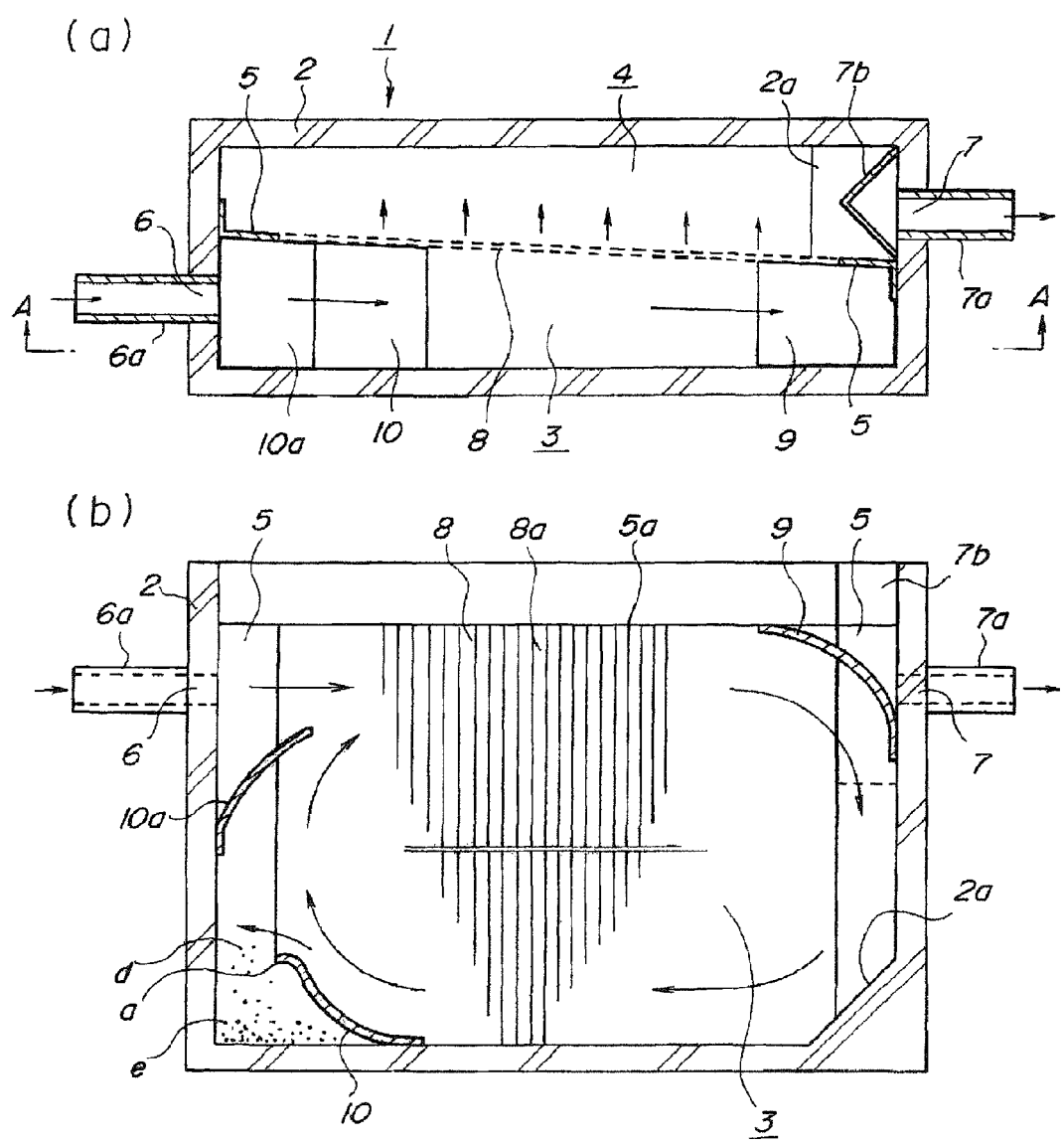
FIG. 1 shows a first embodiment of the separator, wherein (a) is a plan view and (b) an A-A cross-sectional view of (a).

REFERENCE SIGNS LIST a extension
d gap
e accumulation section
1 separator
2 separation tank
2a inclined surface
2b lid
3 inflow chamber
4 outflow chamber
5 partition plate
5a overflow section
6 liquid inlet
6a short pipe
7 discharge outlet
7a short pipe
7b weir
7c discharge line
8 screen, wedge wire screen
8a wedge wires
8b slits
8c support rods
8d heads
8e, 8f ends
9, 10, 10a guides
11 guide body
12 discharge outlet
13 drain outlet
12a opening
12b lid
13a pipe
13b opening/closing valve
20 supply part
21 pump
30 first chamber
31 second chamber
32 dividing body
33 opening part
34 lid
35 overflow section
36 deposition section

BEST MODES FOR CARRYING OUT THE INVENTION

The best-mode embodiments of the present invention will be described below on the basis of the drawings. The description hereinafter will be mainly based on examples of drainage water such as sewage water, but it should be noted that the flowing liquid to which the present invention is applicable is not limited to the drainage water but the present invention is applicable to any flowing liquid containing solids to be separated.

Embodiment 1

FIG. 1 shows the first embodiment of the separator according to the present invention, wherein (a) is a plan view and (b) is an A-A cross-sectional view of (a). The separator 1 has a separation tank 2, a partition plate 5 partitioning an inside space of the separation tank 2 into an inflow chamber 3 and an outflow chamber 4, a liquid inlet 6 formed at an upper part of the inflow chamber 3, and a discharge outlet 7 formed at an upper part of the outflow chamber 4, and the partition plate 5 is provided with a screen 8. The screen 8 may be attached directly to the peripheral wall part of the separation tank 2, without providing the partition plate 5, and in that case, the screen 8 also serves as the partition plate 5.

The separation tank 2 shown in FIG. 1 is formed with a plane cross section of a rectangular shape having a longitudinal axis and a transverse axis, but the plane cross section may be an elliptical shape or a rectangular-circular shape rectangular on the liquid inlet side and circular on the discharge outlet side. The separation tank 2 may be made of a material, for example, concrete, steel, FRP (fiber reinforced plastic), or resin such as polyethylene. When the separator 1 is installed in a sewerage pipe, the separation tank 2 is buried in the earth so as to fit the pipe, but the upper part thereof is exposed in the ground surface and is closed by a lid (not shown) such as a detachable iron plate.

The liquid inlet 6 consists of a through hole with its axial direction perpendicular to the peripheral wall surface, which is formed in the peripheral wall of the separation tank 2, and a short pipe 6*a* is coupled to the liquid inlet 6. The discharge outlet 7 also consists of a through hole with its axial direction perpendicular to the peripheral wall surface, which is formed in the peripheral wall of the separation tank 2, and a short pipe 7*a* is coupled to the discharge outlet 7. Pipes or the like constituting a sewerage pipe line can be connected to these short pipes 6*a*, 7*a*, but it is also possible to omit at least one of the short pipes 6*a*, 7*a* and to connect a pipe or the like directly to the liquid inlet 6 or to the discharge outlet 7.

Provided inside the inflow chamber 3 are an arcuate guide 9 for turning the flowing liquid influent in the horizontal direction from the liquid inlet 6, to a downward direction, an arcuate guide 10 for turning the flowing liquid having turned downward and returning toward the liquid inlet 6, to an upward direction, and a guide 10*a* for turning the swirling flow ascending along the peripheral wall, to the horizontal direction. A vertical swirling flow is formed in the inflow chamber 3 by turn promoting action of these guides 9, 10, 10*a*. There is a gap d provided between an end of the guide 10 and the peripheral wall on which the swirling flow ascends, and a solid accumulation part e is formed in a lower region below the gap d. The guide 10 has the main body part formed in an arcuate shape and an extension a extending in the horizontal direction is provided at the arcuate tip thereof. The guides 9, 10, 10*a* may be provided by inclining flat plate members.

The guides 9, 10, 10*a* can be made of a material, for example, steel, FRP, resin such as polyethylene, or concrete. In the present embodiment, an inclined surface 2*a* is formed in part of the bottom on the liquid inlet 6 side and on the discharge outlet 7 side in the separation tank 2, so as to further enhance the vertical swirling flow forming action.

The partition plate 5 is provided so as to be biased from the longitudinal direction of the separation tank 2. Namely, as shown in FIG. 1(*a*), the end of the partition plate 5 on the liquid inlet 6 side is fixed at a position closer to one peripheral wall in the transverse direction of the separation tank 2, while the end thereof on the discharge outlet 7 side is fixed at a position closer to the other peripheral wall in the transverse direction of the separation tank 2. For this reason, the partition plate 5 is provided in a state in which it is obliquely inclined with respect to the longitudinal axis when viewed from top, i.e., is biased from the longitudinal direction, and therefore the screen 8 provided thereat is also provided so as to be biased from the longitudinal direction.

The screen 8 to be used can be a perforated metal screen made of perforated metal obtained by punching a metal sheet of stainless steel or the like so as to form small-size holes by press machining, which is generally used in this field. However, if the thickness of the metal sheet needs to be several millimeters, the diameters of holes to be processed in the thickness can also be several millimeters; for example, in the case where the solids to be separated are fine solids, e.g., solids with an average particle diameter of about several micrometers to 1 mm, it is desirable to use a wedge wire screen suitable for separation of such solids. The example of FIG. 1 uses the wedge wire screen. The wedge wire screen will be specifically described below.

Figure 6:
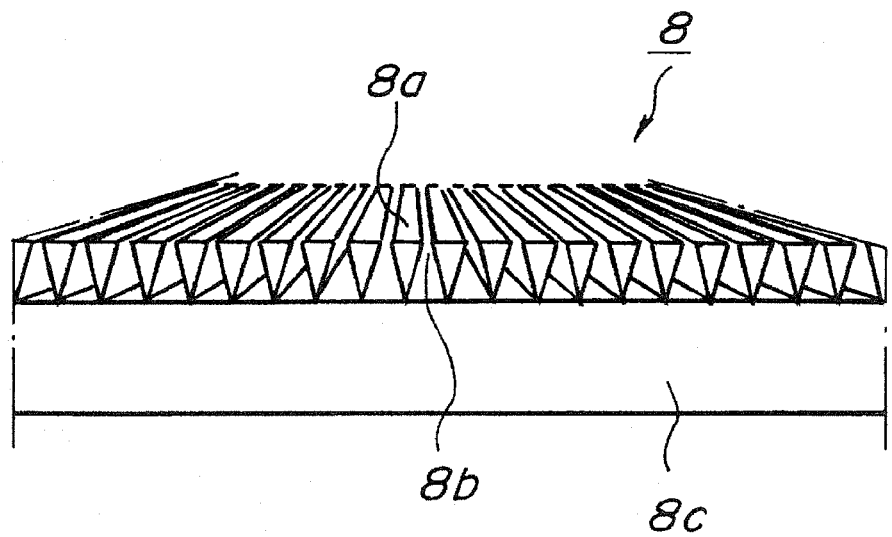
FIG. 6 includes (a) a perspective view of a wedge wire screen as viewed from a front thereof and (b) a perspective view of the wedge wire screen as viewed from an obliquely upward direction.
Figure 6:
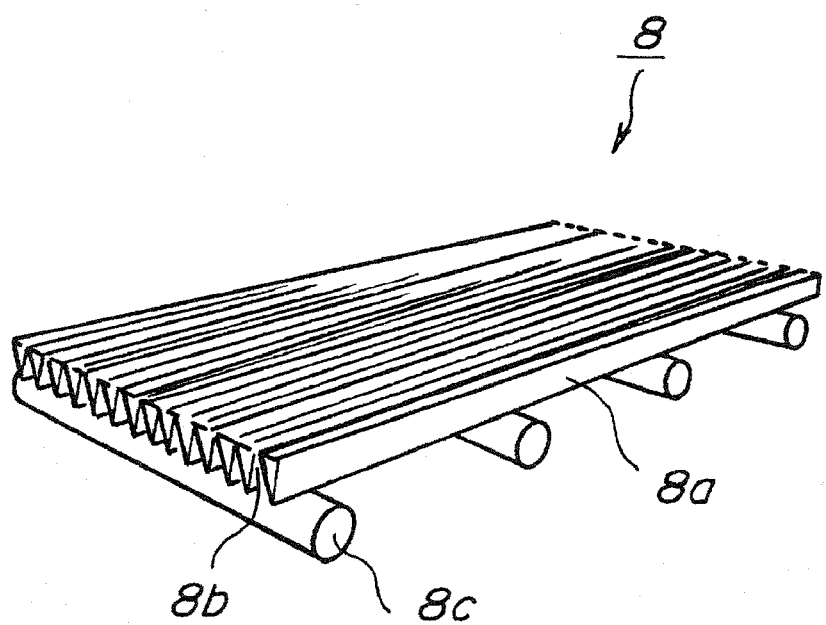

FIG. 6(*a*) is a perspective view of the wedge wire screen 8 (which is used as the screen 8 in FIG. 1) as viewed from the front thereof, and FIG. 6(*b*) a perspective view of the wedge wire screen 8 as viewed from an obliquely upward direction.

The wedge wire screen 8 is constructed by arranging a plurality of wedge wires 8*a* of a wedge-shaped cross section in parallel to each other, and small slits 8*b* of about 10 μm to 1 mm are formed between the wedge wires 8*a*. Each wedge wire 8*a* is fixed to a plurality of support rods 8*c* by spot welding or the like. Each wedge wire 8*a* and support rod 8*c* are made of a corrosion-resistant metal material, e.g., stainless steel or the like. Each slit 8*b* formed in the wedge wire screen 8 blocks passage of solids of about 10 μm to 1 mm, but allows only the flowing liquid containing solids smaller than the slit width to pass. The wedge wire screen 8, as shown in FIG. 1(*b*), is provided at the partition plate 5 so that the axial direction of each wedge wire 8*a* agrees with the vertical direction of the separation tank 2.

Figure 7:
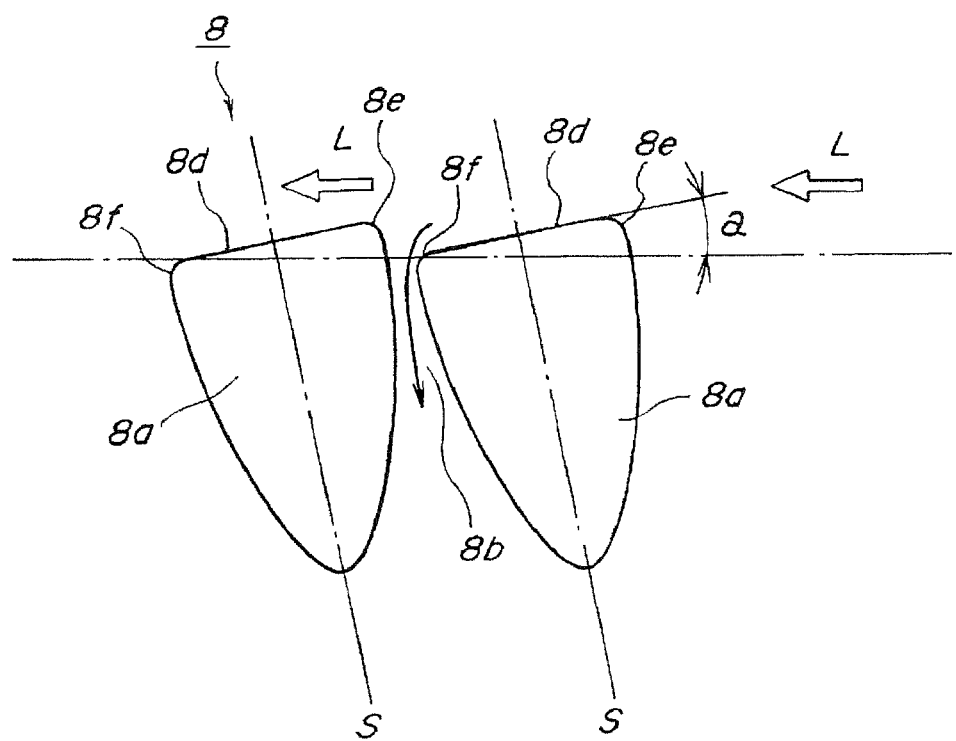
FIG. 7 is a partly enlarged cross-sectional view of wedge wires and a slit forming a wedge wire screen.

FIG. 7 is a partly enlarged cross-sectional view of wedge wires 8*a* and slit 8*b* forming the wedge wire screen 8 shown in FIG. 6. The wedge wires 8*a* of the wedge-shaped cross section are arranged in parallel to each other at predetermined intervals and surfaces of heads 8*d* thereof form a part of the surface of the inflow chamber. Axis lines S of wedges normally extending from the surfaces of the heads 8*d* are inclined toward the downstream side of the vertical swirling flow direction along the inside surface of the inflow chamber 3 indicated by arrows L. An angle α between the swirling flow direction L and the surface of each head 8*d* is set in the range of 3° to 8°, normally, at about 5°.

When the axis line S of each wedge wire 8*a* is inclined as described above, an end 8*e* of the head 8*d* on the upstream side of the swirling flow projects into the inside of the inflow chamber 5 more than an end 8*f* of the head 8*d* on the downstream side. For this reason, the swirling flow collides with the projecting end 8*e* of each wedge wire 8*a* to be efficiently pulled into the slit 8*b* by the Coanda effect. Therefore, if the slit width is decreased in order to separate solids of micron order, the aperture ratio of the screen will become very small, but liquid passage is improved by the Coanda effect so as to achieve an effect of substantially increasing the aperture ratio of the screen. When it becomes feasible to improve the liquid passage as described above, the separation processing performance can be maintained at a considerable level even if the slit space is made extremely small in order to separate the fine solids.

The wedge wire screen 8 shown in FIG. 1 is sectioned into upper and lower parts on both sides of a boundary at an intermediate part in the vertical direction. The axis lines S of wedges extending normally from the surfaces of the heads 8*d* in the upper part of wedge wire screen 8 are inclined in a direction opposite to a direction of those in the lower part of wedge wire screen 8, and each axis line is inclined toward the downstream side of the vertical swirling flow direction along the inside of the inflow chamber 3 indicated by the arrows.

As shown in FIG. 1(*b*), a space is formed above the partition plate 5. This space, as described above, forms an overflow section 5*a* functioning as follows: when a heavy rain or the like causes oil and floating solids, together with a large amount of flowing liquid, to flow into the inflow chamber 3, the overflow section 5*a* makes the oil and floating solids, together with the flowing liquid failing to pass through the screen 8, to overflow into the outflow chamber.

Furthermore, as shown in FIG. 1(*a*), a weir 7*b* is provided on the outflow chamber 4 side of the discharge outlet 7. This weir 7*b* prevents the oil and floating solids overflowing into the outflow chamber, from being discharged through the discharge outlet to the downstream side.

The action of the separator 1 shown in FIG. 1 will be described below. When the flowing liquid is supplied from the upstream side of the pipe through the liquid inlet 6 formed at the upper part of the inflow chamber 3 as indicated by an arrow, the flowing liquid forms the vertical swirling flow inside the inflow chamber 3. Specifically, the supplied flowing liquid horizontally flows in the upper part of the inflow chamber 3 while being restricted on both sides thereof by the surface of the partition plate 5 (and the screen 8) on the inflow chamber 3 side and the peripheral wall surface of the separation tank 2 opposite thereto; the flowing liquid descends while being guided by the downstream guide 9; the flowing liquid then changes its direction to flow through the lower part of the inflow chamber 3 as indicated by an arrow, to return to the upstream side; the flowing liquid then ascends while being guided by the upstream guide 10; the flowing liquid further changes its direction by the guide 10a to again flow horizontally in the upper part of the inflow chamber 3; the vertical swirling flow is continuously formed in the inflow chamber 3 as long as the supply of flowing liquid continues.

Since the gap d is provided between the end of the guide 10 and the peripheral wall on which the swirling flow ascends as described above, a part of the ascending swirling flow close to the peripheral wall is pushed out toward the peripheral wall to decrease its flow rate, and solids with relatively large specific gravity lose their ascending force upon entry into the flow rate decreased region to drop downward through the gap. The accumulation section e to accumulate the solids is formed in a lower region below the gap d. The solids thus accumulated become ready to be taken out to the outside on an as-needed basis.

Figure 4:
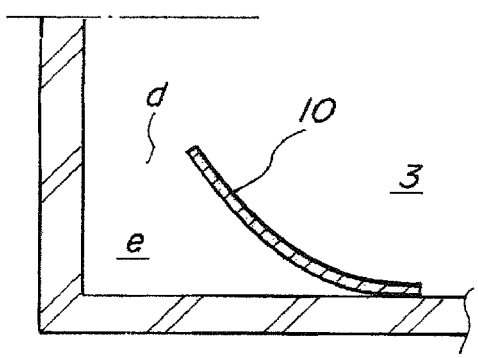
FIG. 4 includes (a) an example of a guide without an extension and (b) an example of a guide with an extension of a small arcuate shape.
Figure 4:
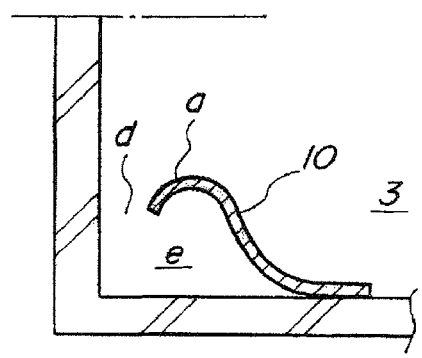

The guide 10 has an arcuate main body, and is provided with a horizontally extending extension a at the end thereof. When this extension a is provided, an attraction effect along the extension a by the Coanda effect is added during pushing the part of the swirling flow close to the peripheral wall, toward the peripheral wall, so as to increase the separation and sedimentation effect of solids. FIG. 4(a) shows an example of the guide 10 without the extension a and FIG. 4(b) an example of the guide 10 with the small arcuate extension a. Either of these guides 10 of FIGS. 4(a) and (b) can be used in the present invention.

The vertical swirling flow circulates in the inflow chamber 3 as described above, and when the swirling flow is regarded as a flux of flow, the top surface of the flux of the swirling flow during horizontal flow from the liquid inlet 6 descends as guided by the downstream guide 9 and becomes the bottom surface during return to the upstream side through the lower part of the inflow chamber 3. On the other hand, the bottom surface of the flux of the swirling flow during the horizontal flow from the liquid inlet 6 descends as guided by the downstream guide 9 and becomes the top surface during return to the upstream side through the lower part of the inflow chamber 3. Then the screen 8 is positioned so as to extend along the side face of the swirling flow perpendicular to the top and bottom surfaces thereof.

The screen 8 provided at the partition plate 5 is disposed along the side face of the vertical swirling flow formed as described above, and a part of the swirling flow passes through the screen 8 into the outflow chamber 4. The flowing liquid influent into the outflow chamber 4 is guided therefrom through the discharge outlet 7 to be discharged to the downstream side of the pipe. Since the present embodiment uses the wedge wire screen 8 as the screen 8 as described above, it is able to efficiently separate even fine solids as well.

On the other hand, the solids prevented from passing into the outflow chamber 4 by the screen 8 circulate inside the inflow chamber 3 on the vertical swirling flow as they are. On that occasion, some of the solids are attached to the surface of the screen 8, but since the screen 8 is disposed along the side face of the vertical swirling flow, the solids attaching to the screen 8 are peeled off by the vertical swirling flow, so as not to cause clogging of the screen 8.

Of the solids circulating in the inflow chamber 3 on the swirling flow, solids with relatively large specific gravity become gradually deposited in the bottom part of the inflow chamber 3 by gravity, whereas floating fine solids circulate inside the inflow chamber 3 for a considerably long time. However, the fine solids circulate inside the inflow chamber 3 and even with long-term operation of the separator 1, an accumulated amount thereof is only an extremely small amount in comparison with the inner volume of the inflow chamber 3. Therefore, it is less necessary to decrease operation suspension interval of the separation tank device 1 for cleaning of the separation tank 2, and there arises no problem in practical use.

Embodiment 2

Figure 2:
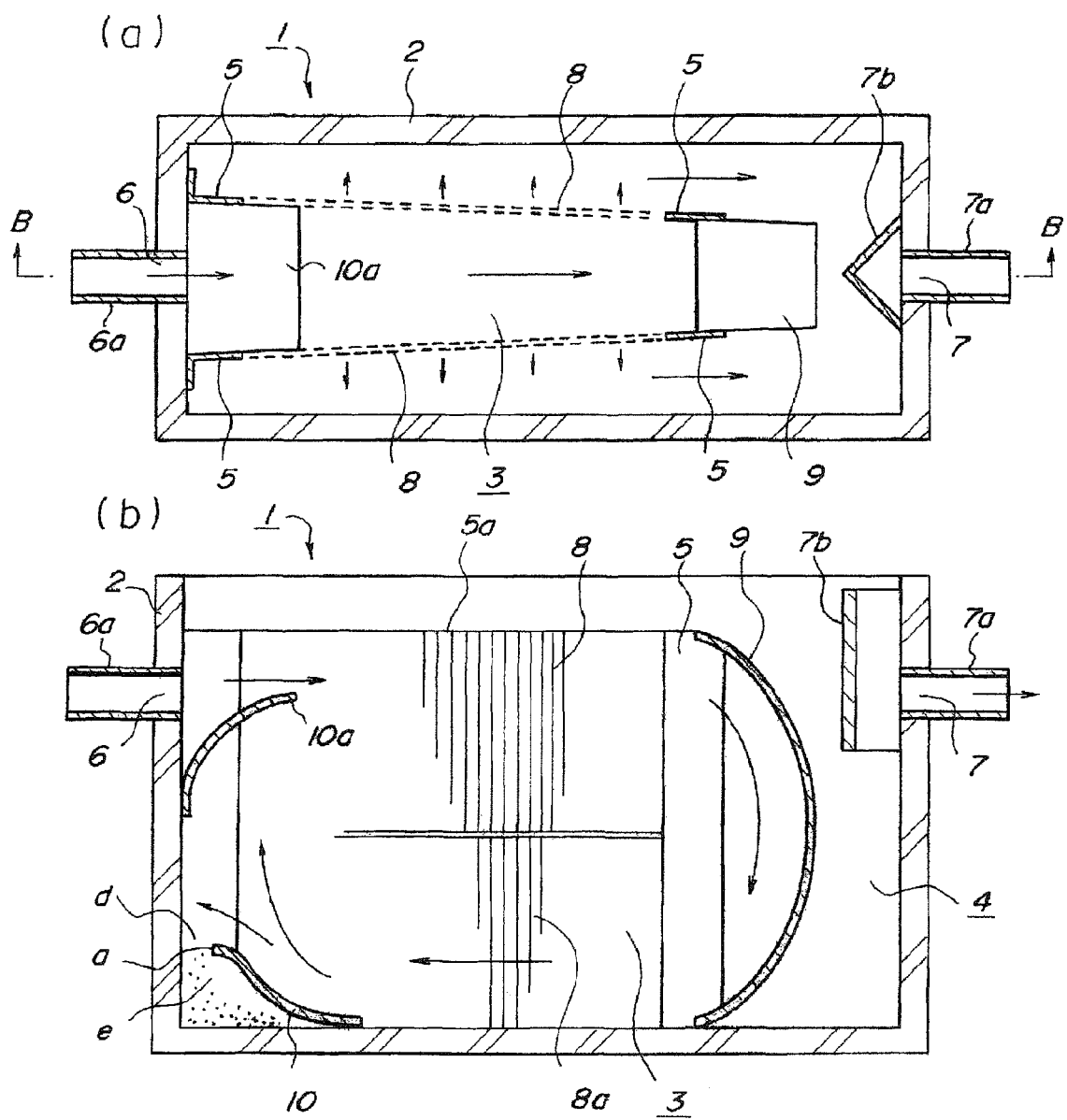
FIG. 2 shows a second embodiment of the separator, wherein (a) is a plan view and (b) a B-B cross-sectional view of (a).

FIG. 2 shows the second embodiment of the separator according to the present invention, wherein (a) is a plan view and (b) a B-B cross-sectional view of (a). The separator 1 of the second embodiment is different from the example of FIG. 1 in that two screens 8 are used and downstream ends of the two screens 8 are coupled to each other through the guide 9, and the other part is configured in the same manner as in the example of FIG. 1. Therefore, the same portions as those in FIG. 1 are denoted by the same reference symbols in FIG. 2, and redundant description is omitted herein.

The guide 9 in the second embodiment, as shown in FIG. 2(b), is composed of a U-shaped plate with a vertical cross section of an arcuate shape and side plates closing two sides thereof, and one ends of the respective partition plates 5 are coupled thereto along its vertical edges. The guide 9 in the present embodiment also serves as a part of the partition plates 5. The two partition plates 5 are arranged so that the distance between them decreases with distance from the liquid inlet 6 toward the downstream side, and thus the two screens 8 provided at the respective partition plates 5 are also arranged so that the distance between them decreases with distance from the liquid inlet 6 toward the downstream side. The inside space surrounded by the two partition plates 5 and the guide 9 constitutes the inflow chamber 3 and the inside space surrounded by the outside of the two partition plates 5 and the guide 9 and the peripheral wall of the separation tank 2 constitutes the outflow chamber 4.

The action of the separator 1 shown in FIG. 2 will be described below. When the flowing liquid from the upstream side of the pipe is supplied to the approximate center part between the two partition plates 5 through the liquid inlet 6 formed at the upper part of the inflow chamber 3 as indicated by an arrow, the flowing liquid forms the vertical swirling flow inside the inflow chamber 3 while being restricted on both sides thereof by the two partition plates 5 (and two screens 8). Namely, the supplied flowing liquid horizontally flows in the upper part of the inflow chamber 3; it descends while being guided by the downstream guide 9; then it changes direction to pass in the lower part of the inflow chamber 3 as indicated by an arrow to return to the upstream side; it ascends from there while being guided by the upstream guide 10; then it changes direction by the guide 10a to again form the swirling flow horizontally flowing in the upper part of the inflow chamber 3.

The screens 8 provided at the two partition plates 5 are arranged along the respective side faces of the vertical swirling flow, a part of the swirling flow passes through the two screens 8 into the outflow chamber 4, and the flowing liquid flowing into the outflow chamber 4 passes therefrom through the discharge outlet 7 to be discharged to the downstream side of the pipe. The present embodiment also uses the wedge wire screens 8 as the two screens 8 or uses the two screens 8, whereby even fine solids can be efficiently separated, with little deviation of the solids in the flowing liquid to either one of the screens 8. The partition plates 5 can also be omitted, and in that case the screens 8 also serve as the partition plates 5; thus the two ends thereof are directly coupled to the peripheral wall of the inflow chamber 3 and the guide 9.

Embodiment 3

Figure 3:
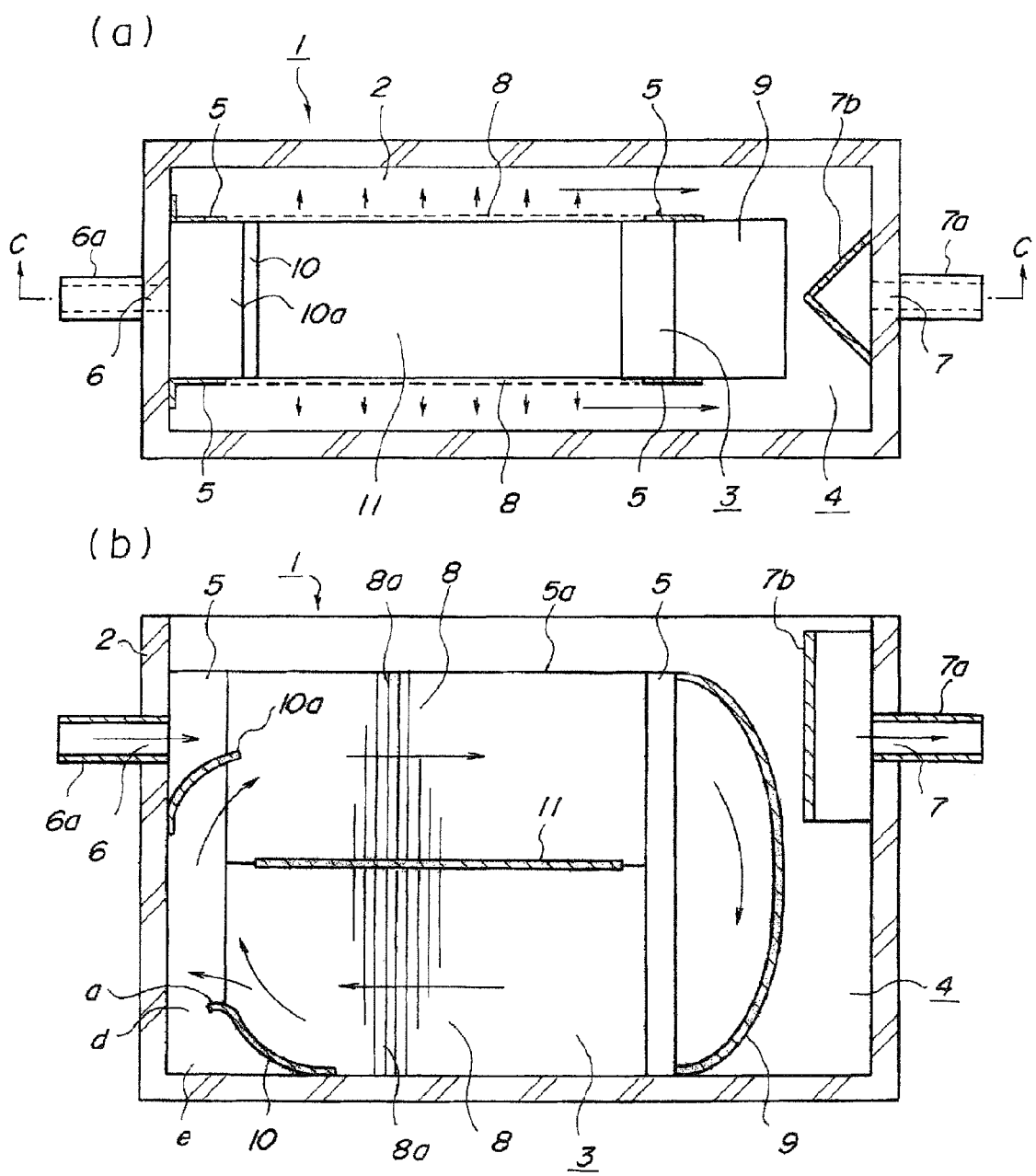
FIG. 3 shows a third embodiment of the separator, wherein (a) is a plan view and (b) a C-C cross-sectional view of (a).

FIG. 3 shows the third embodiment of the separator according to the present invention, wherein (*a*) is a plan view and (*b*) a C-C cross-sectional view of (*a*). The separator 1 of the third embodiment is a modification example of the embodiment of FIG. 2 and is different in the following three points from the example of FIG. 2: the two partition plates 5 are arranged so that they are parallel to each other from the liquid inlet 6 toward the downstream side; thus the two screens 8 provided at the respective partition plates 5 are also arranged so that they are parallel to each other from the liquid inlet 6 toward the downstream side; and a guide body 11 comprised of a plate member of a rectangular shape extending horizontally is provided in the middle part of the inflow chamber 3; the other part is configured in the same manner as in the example of FIG. 2. Therefore, the same portions as those in FIG. 2 are denoted by the same reference signs, and redundant description is omitted herein.

When the function to form the vertical swirling flow of the flowing liquid supplied through the liquid inlet 6 is compared between in the case where the two screens 8 are arranged so that the distance between them decreases with distance from the liquid inlet 6 toward the downstream side as shown in FIG. 2 and in the case where the screens 8 are arranged so that they are parallel to each other from the liquid inlet 6 toward the downstream side as shown in FIG. 3, there is no substantial difference between them, but the liquid passage rate through the screens 8 is slightly better in the arrangement of FIG. 2 because of the Coanda effect, whereas attachment of solids to the screens tends to decrease in the arrangement of FIG. 3 where the two screens 8 are parallel.

As shown in FIG. 3(*a*), the plate surface of the guide body 11 is arranged in parallel with the horizontal direction in the inflow chamber 3, and the main region inside the inflow chamber 3 is divided into upper and lower spaces by the plate surface, whereby the flowing liquid is guided with definite division between the downward flow from the liquid inlet 6 toward the downstream side in the upper space above the guide body 11 and the upward flow from the guide 9 toward the upstream liquid inlet 6 in the lower space below the guide body 11, so as to more readily and securely form the vertical swirling flow.

The screens 8 are the wedge wire screens 8, the wedge wire screens 8 are divided into upper and lower parts, and the guide body 11 is fixed in a state in which it is sandwiched at the division position between them. In order to efficiently fulfill the Coanda effect at both of the upper and lower wedge wire screens 8, the axis lines s extending from the heads 8*d* of the respective wedge wires 8*a* toward the distal ends thereof in the upper parts of wedge wire screens 8 are inclined toward the discharge outlet 7 side (downstream side of the swirling flow), and the axis lines s extending from the heads 8*d* of the respective wedge wires 8*a* toward the distal ends thereof in the lower parts of wedge wire screens 8 are inclined toward the liquid inlet 6 side (downstream side of the swirling flow). Namely, the axis lines s from the heads 8*d* of the respective wedge wires 8*a* toward the distal ends thereof in the upper and lower parts of wedge wire screens 8 are inclined in the opposite directions to each other according to the upper flow and the lower flow of the vertical swirling flow.

It is also possible to integrally construct the wedge wire screens 8 without division into the upper and lower parts as described above, and in that case, attachment brackets are provided in the middle portions of the wedge wire screens 8 and the guide body 11 is attached to the attachment brackets with bolts or the like.

The guide body 11 used in the present embodiment can also be used in the example of FIG. 2. The present embodiment can also additionally use the guide 10 used in FIG. 2. Furthermore, the partition plates 5 may also be omitted in the present embodiment and in that case, the screens 8 also serve as the partition plates 5 and their two ends are coupled directly to the peripheral wall of the inflow chamber 3 and the guide 9.

Embodiment 4

Figure 5:
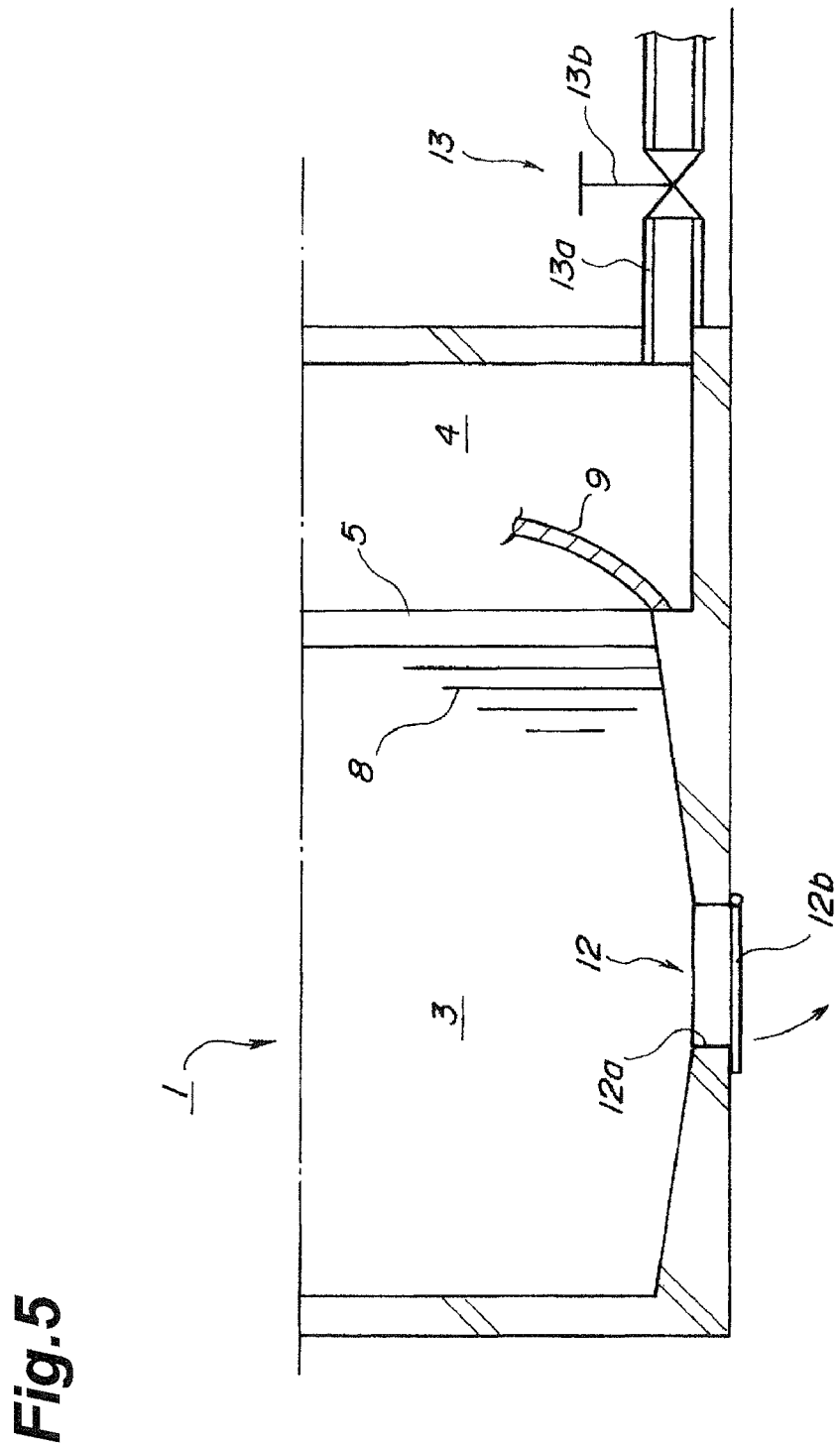
FIG. 5 is a partial cross-sectional view showing a fourth embodiment of the separator, in which an inflow chamber and an outflow chamber are modified in their lower part.

FIG. 5 is a partial cross-sectional view showing the fourth embodiment of the separator according to the present invention, which is a modification of the lower part of the inflow chamber 3 and outflow chamber 4 in the example of FIG. 2 or in the example of FIG. 3. The fourth embodiment is different from the example of FIG. 2 or FIG. 3 in that a tapered portion is formed at the bottom of the inflow chamber 3, a bottom of the tapered portion is provided with a solid discharge outlet 12, and a drain outlet 13 is coupled to the peripheral wall part in contact with the bottom of the outflow chamber 4; the other part is configured in the same manner as in the example of FIG. 2 or FIG. 3. Therefore, the illustration of the other part than the differences is omitted from the drawing.

The discharge outlet 12 in the fourth embodiment is used to discharge the solids accumulated in the inflow chamber 3, to the outside on an as-needed basis, for example, in the case where the separator 1 is installed on the ground. The discharge outlet 12 is composed of an opening 12*a* and a lid 12*b* that closes the opening and that can be freely opened and closed, and the solids in the inflow chamber 3 can be discharged to the outside by opening the lid 12*b*.

The drain outlet 13 in the fourth embodiment is used in order to discharge remaining water from the outflow chamber 4 through the drain outlet 13 to the outside on the occasion of performing internal cleaning, maintenance, or the like with the operation of the separation tank 2 being suspended, for example, in the case where the separator 1 is installed on the ground. The drain outlet 13 is composed of a pipe 13*a* and an opening/closing valve 13*b* provided therein, and the remaining liquid in the separation tank 2 can be discharged from the outflow chamber 4 to the outside by opening the opening/closing valve 13*b*.

Embodiment 5

Figure 8:
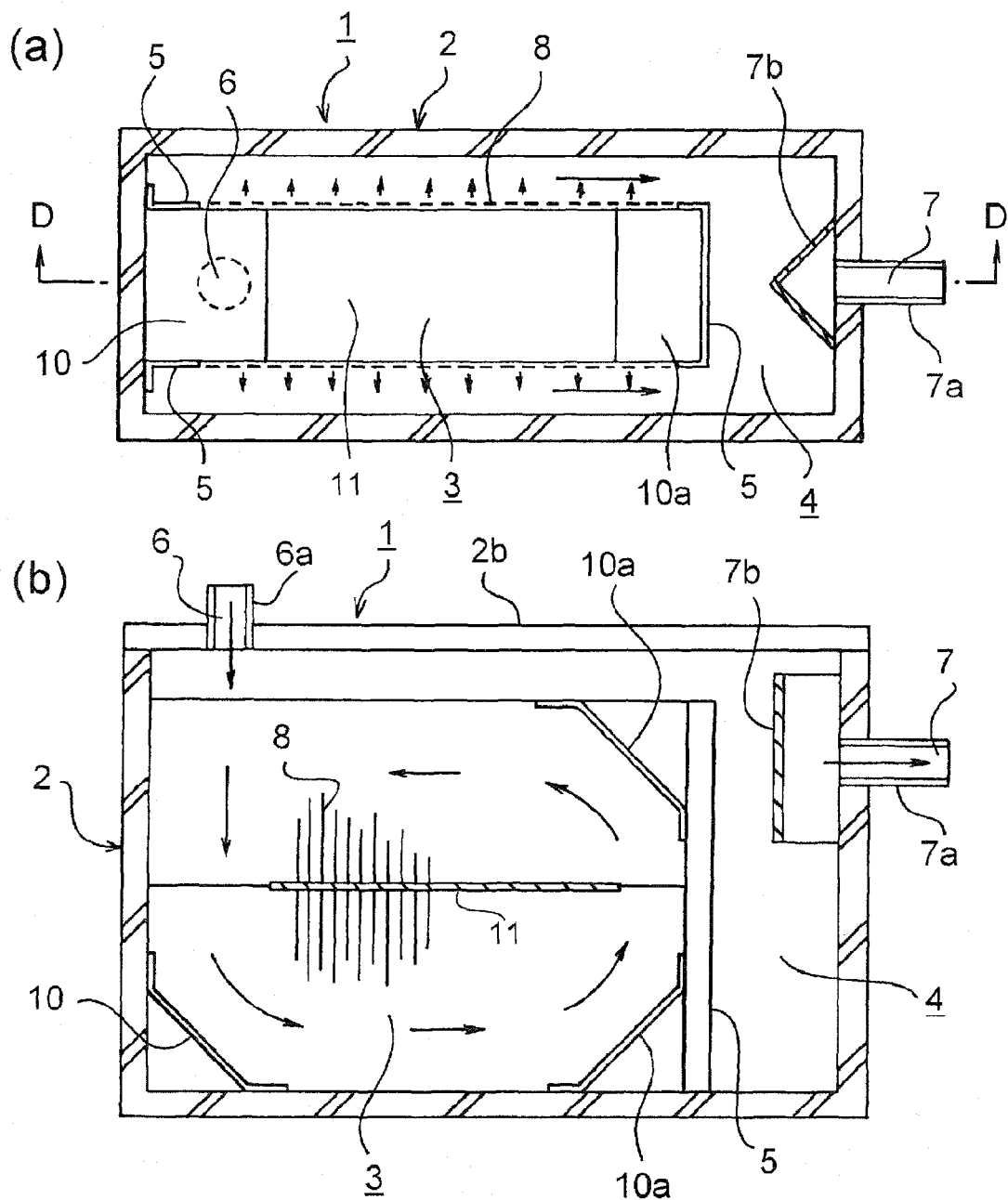
FIG. 8 shows a fifth embodiment of the separator, wherein (a) is a plan view and (b) a D-D cross-sectional view of (a).

FIG. 8 shows the fifth embodiment of the separator according to the present invention, wherein (*a*) is a plan view and (*b*) a D-D cross-sectional view of (*a*). The separator 1 of the fifth embodiment is a modification example of the embodiment of FIG. 3, and is different from the example of FIG. 3 in the position of the liquid inlet 6 formed at the inflow chamber 3 and in the arrangement relation of the guides 10, 10*a*, and the other part is configured in the same manner as in the example of FIG. 3. Therefore, the same portions as those in FIG. 3 are denoted by the same reference symbols, and redundant description is omitted herein.

In the fifth embodiment, the upper part of the separation container 2 is open and its open part is closed by a lid 2*b*. The liquid inlet 6 is formed at the upper part of the inflow chamber 3 (specifically, at a portion of the lid 2*b*), and the flowing liquid from the liquid inlet 6 flows downward. The guide 10 comprised of an inclined plate is provided at the position opposite to the liquid inlet 6, i.e., at the left corner of the bottom in the inflow chamber 3. Furthermore, the guides 10a comprised of inclined plates are also provided at two locations, the right corner of the bottom and the right upper corner, in the inflow chamber 3.

The flowing liquid influent from the liquid inlet 6 descends in the inflow chamber 3; it is turned to the right by the guide 10 at the left corner of the bottom of the inflow chamber 3; it is then turned to the upward direction by the guide 10a at the right corner of the bottom; it is further turned to the left by the guide 10a at the right upper corner; as a result, the vertical swirling flow as shown is formed in the inflow chamber 3.

The flowing liquid in the inflow chamber 3 passes through the screens 8 (wedge wire screens 8) formed along the side faces of the swirling flow, into the outflow chamber 4 and it is discharged through the discharge outlet 7 to the outside. On the other hand, the solids prevented from passing into the outflow chamber 4 by the screens 8, circulate inside the inflow chamber 3 on the vertical swirling flow as they are. On that occasion, some of the solids attach to the surfaces of the screens 8, but the attaching solids are peeled off by the vertical swirling flow. The separator 1 of the fifth embodiment configured as described above is suitably applicable to the case where the flowing liquid is supplied from top.

Embodiment 6

Figure 9:
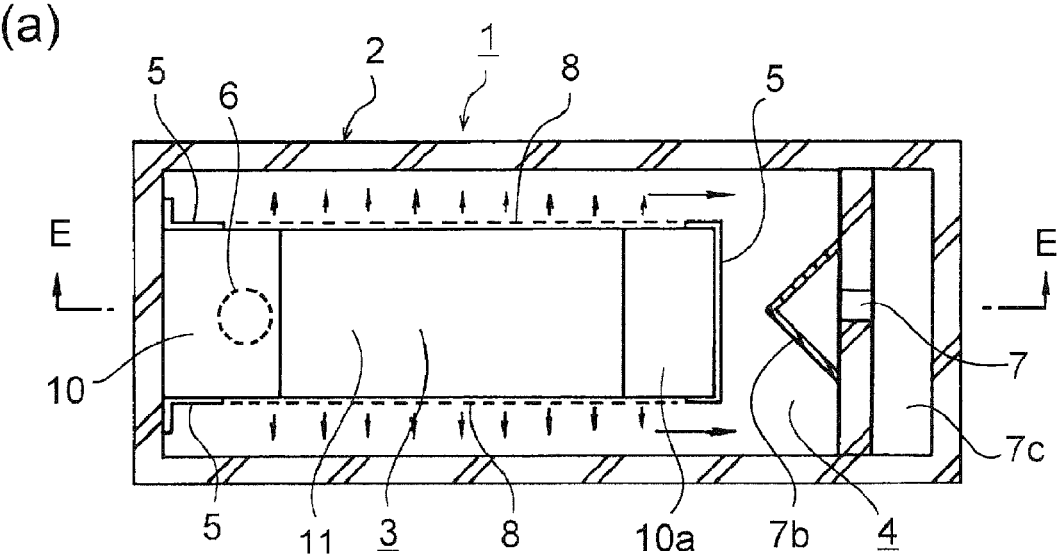
FIG. 9 shows a sixth embodiment of the separator, wherein (a) is a plan view and (b) an E-E cross-sectional view of (a).
Figure 9:
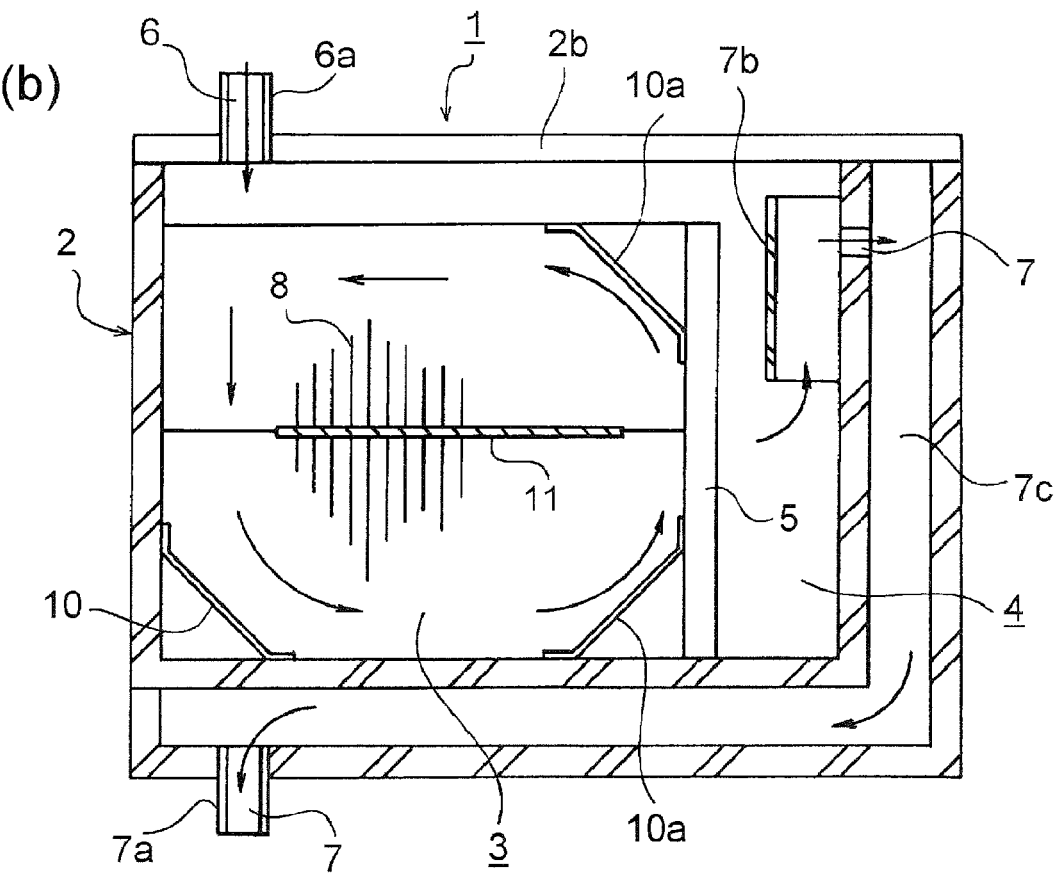

FIG. 9 shows the sixth embodiment of the separator according to the present invention, wherein (a) is a plan view and (b) is an E-cross-sectional view of (a). The separator 1 of the sixth embodiment is a modification example of the embodiment of FIG. 8 and is different from the example of FIG. 8 in that a discharge path 7c is provided outside the discharge outlet 7, and the other part is configured in the same manner as in the example of FIG. 8. Therefore, the same portions as those in FIG. 8 are denoted by the same reference symbols, and redundant description is omitted herein.

In the sixth embodiment, the lower part and the right part of the separation container 2 are constructed in a double wall structure, the inflow chamber 3 and the outflow chamber 4 are formed inside the inside wall, and the discharge path 7c is formed between the inside wall and the outside wall. The flowing liquid passing through the screens 8 (wedge wire screens 8) and flowing into the outflow chamber 4, is discharged through the discharge outlet 7 into the discharge path 7c with a vertical cross section of L-shape, and is discharged through the short pipe 7a formed in the vicinity of the end of the discharge path, to the outside. The separator 1 of the sixth embodiment configured as described above can be used in a form in which it is inserted in the middle of a pipe through which the flowing liquid flows vertically.

Embodiment 7

Figure 10:
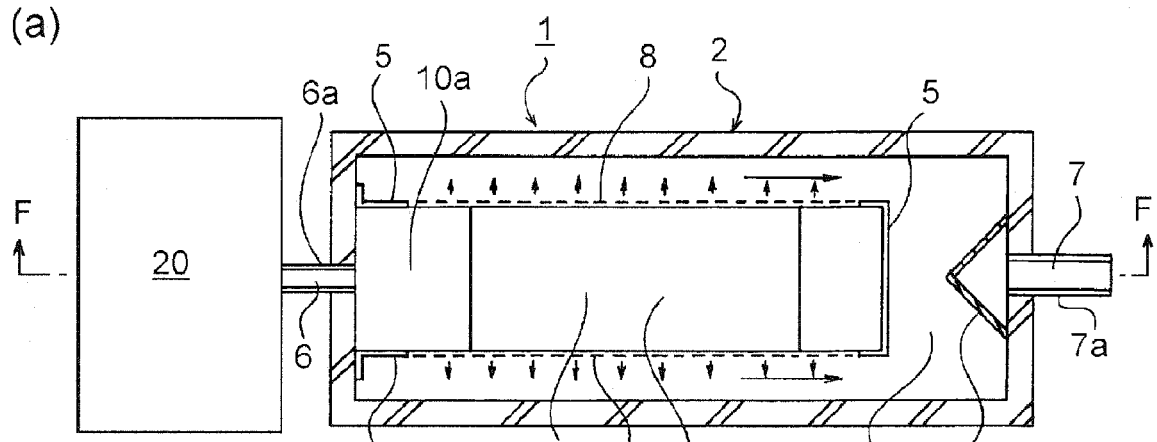
FIG. 10 shows a seventh embodiment of the separator, wherein (a) is a plan view and (b) an F-F cross-sectional view of (a).
Figure 10:
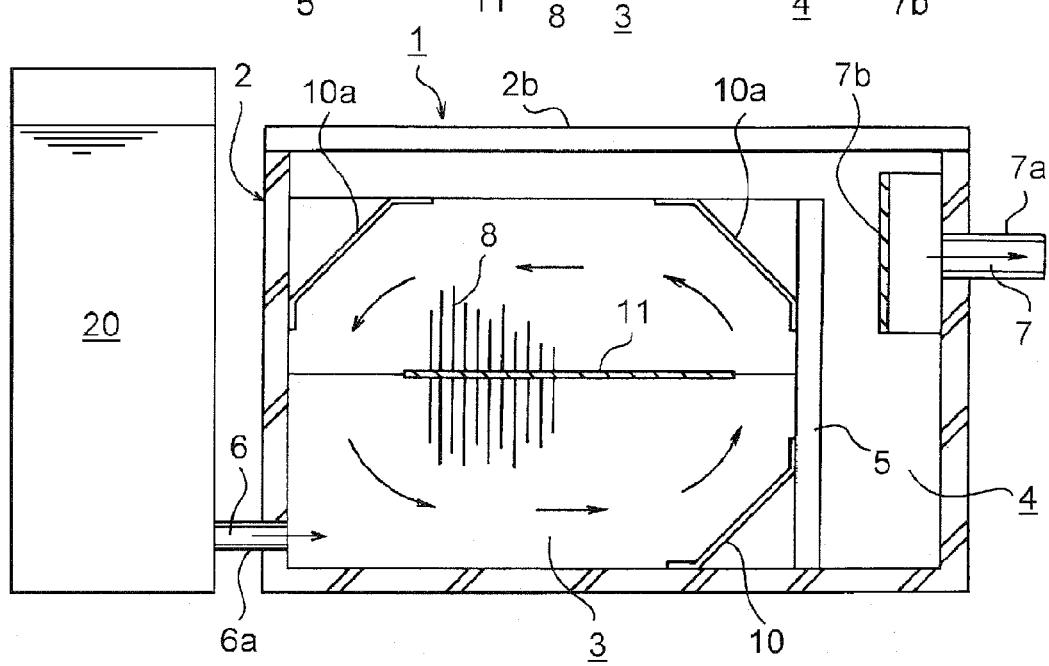

FIG. 10 shows the seventh embodiment of the separator according to the present invention, wherein (a) is a plan view and (b) an F-F cross-sectional view of (a). The separator 1 of the seventh embodiment is another modification example of the embodiment of FIG. 8 and is different from the example of FIG. 8 in the position of the liquid inlet 6 formed at the inflow chamber 3 and in the arrangement relation of the guides 10, 10a, and the other part is configured in the same manner as in the example of FIG. 8. Therefore, the same portions as those in FIG. 8 are denoted by the same reference symbols, and redundant description is omitted herein.

In the seventh embodiment, the liquid inlet 6 is formed at the lower part of the side wall of the inflow chamber 3 and the flowing liquid is supplied from a supply part 20 like a tank or a water tank as illustrated, to the liquid inlet 6. Namely, the flowing liquid is supplied into the inflow chamber 3 by making use of a difference between liquid levels in the supply part 20 and in the inflow chamber 3. An example of the supply part 20 is a water tank or a tank for storage of processing water provided in a pretreatment system for separating relatively large solids such as fallen leaves and papers.

The guide 10 comprised of an inclined plate is provided at the position opposite to the liquid inlet 6, i.e., at the right corner of the bottom in the inflow chamber 3. The guides 10a comprised of inclined plates are also further provided at the right upper corner and at the left upper corner in the inflow chamber 3. The flowing liquid influent horizontally from the liquid inlet 6 is turned by the guide 10 to ascend; it is then turned to the left by the guide 10a at the right upper corner; it is further turned to the downward direction by the guide 10a at the left upper corner to descend; as a result, the vertical swirling flow as shown is formed in the inflow chamber 3.

Embodiment 8

Figure 11:
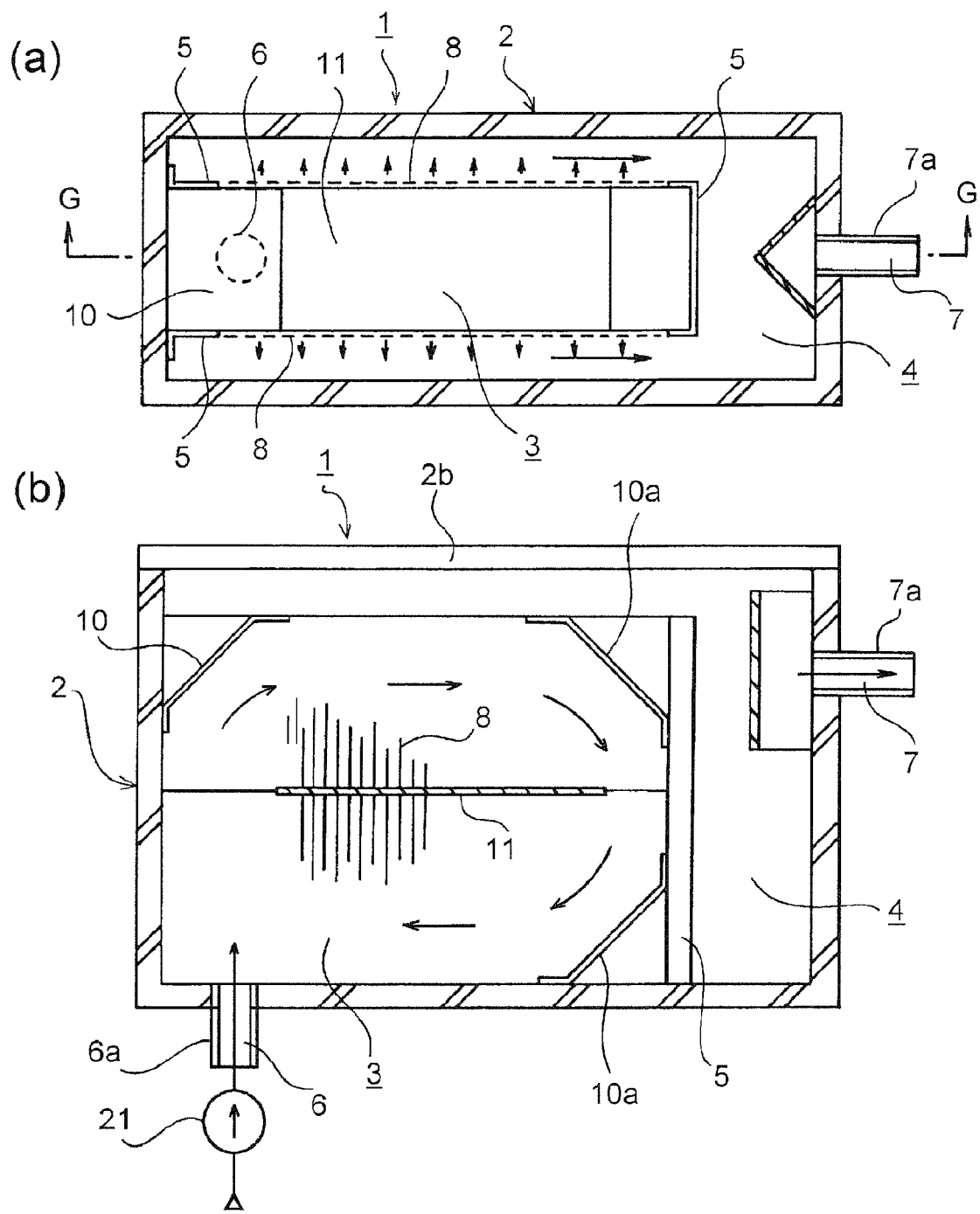
FIG. 11 shows an eighth embodiment of the separator, wherein (a) is a plan view and (b) a G-G cross-sectional view of (a).

FIG. 11 shows the eighth embodiment of the separator according to the present invention, wherein (a) is a plan view and (b) a G-G cross-sectional view of (a). The separator 1 of the eighth embodiment is a modification example of the embodiment of FIG. 10 and is different from the example of FIG. 10 in the position of the liquid inlet 6 formed at the inflow chamber 3 and in the arrangement relation of the guides 10, 10a, and the other part is configured in the same manner as in the example of FIG. 10. Therefore, the same portions as those in FIG. 10 are denoted by the same reference symbols, and redundant description is omitted herein.

In the eighth embodiment, the liquid inlet 6 is formed at the bottom of the inflow chamber 3, and the flowing liquid is supplied from a flowing liquid supply pump 21 as shown, or from the supply part 20 as shown in FIG. 10, to the liquid inlet 6. The guide 10 comprised of an inclined plate is provided at the position opposite to the liquid inlet 6, i.e., at the left upper corner in the inflow chamber 3. The guides 10a comprised of inclined plates are also further provided at the right upper corner and at the left bottom corner in the inflow chamber 3.

The flowing liquid influent upward from the liquid inlet 6 is turned to the right by the guide 10; it is then turned to the downward direction by the guide 10a at the right upper corner to descend; it is further turned to the left by the guide 10a at the left bottom corner; as a result, the vertical swirling flow as shown is formed in the inflow chamber 3.

Figure 12:
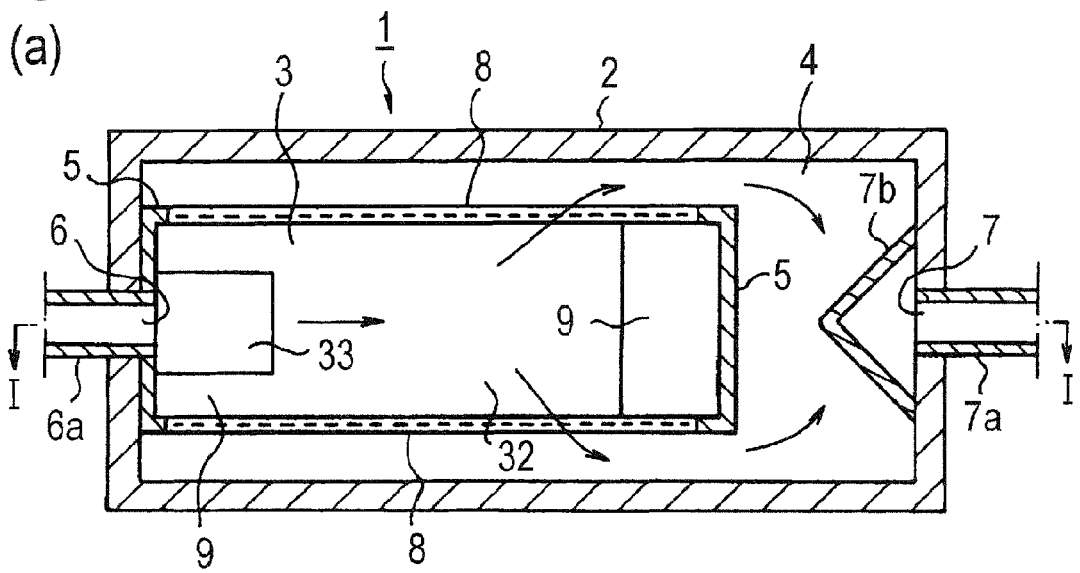
FIG. 12 shows a ninth embodiment of the separator, wherein (a) is a plan view and (b) an H-H cross-sectional view of (a).
Figure 12:
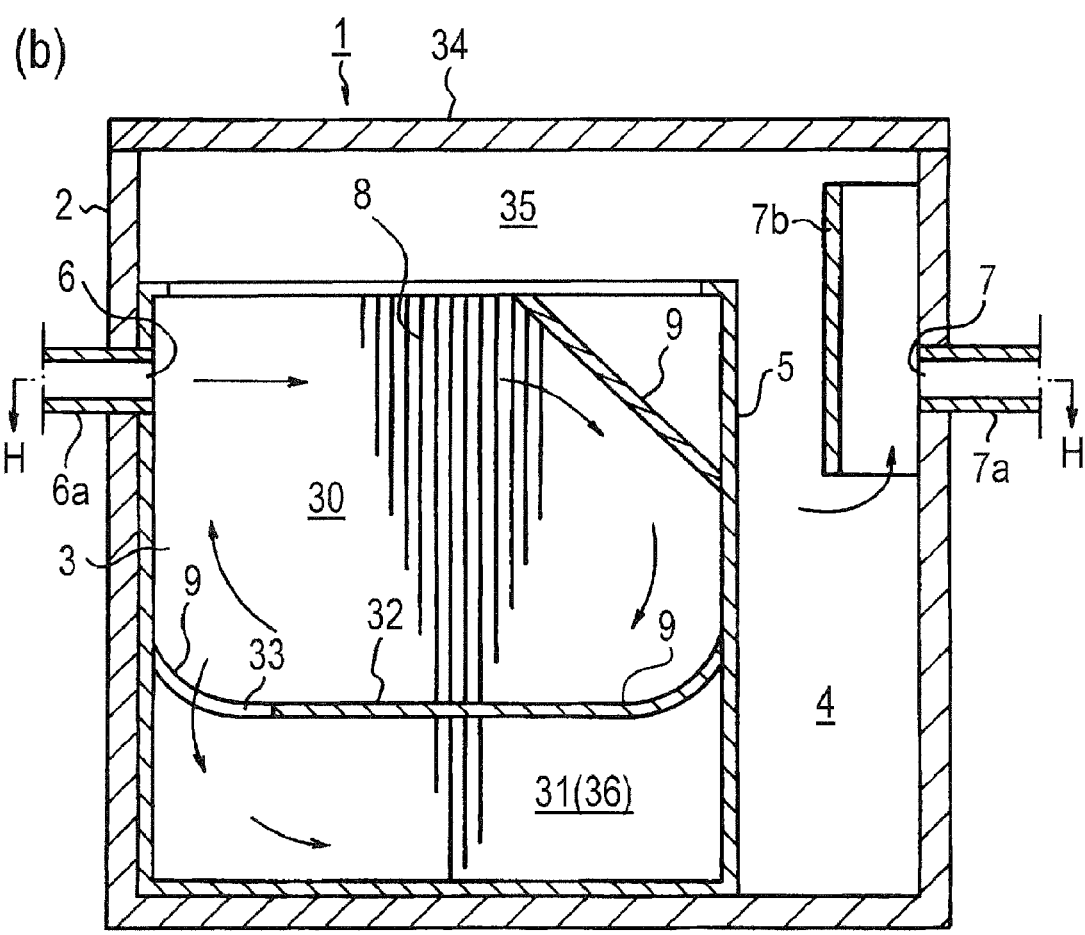

FIG. 12 shows the ninth embodiment of the separator according to the present invention, wherein (a) is a cross-sectional view along an H-H direction of (b) and (b) is a cross-sectional view along an I-I direction of (a).

The separator 1 has the separation tank 2, the partition plate 5 partitioning the inside space of the separation tank 2 into the inflow chamber 3 and the outflow chamber 4, the screens 8 provided at the partition plate 5, a dividing body 32 dividing the inflow chamber 3 into a first chamber 30 and a second chamber 31, an opening part 33 formed at the dividing body 32, the supply part 6 formed at the first chamber 30, and the discharge outlet 7 formed at the outflow chamber 4. The supply part 6 is composed of a through hole made in the side wall of the first chamber 30 and the discharge outlet 7 is composed of a through hole made in the peripheral wall of the outflow chamber 4.

The short pipe 6a, for example, to be connected to an upstream pipe of a sewerage system is connected to the supply part 6 and the short pipe 7a to be connected to a downstream pipe is connected to the discharge outlet 7. The short pipes 6a, 7a may be omitted in certain cases, and the pipes of the sewerage system or the like may be connected directly to the supply part 6 and to the discharge outlet 7.

The separation tank 2 can be made of reinforced concrete, metal, fiber reinforced plastic, or the like. The upper part of the separation tank 2 is in an open state as shown in FIG.

12(*b*), and is closed by a lid 34 that is an iron plate or the like and that can be freely opened and closed, during the separation process. The interior spaces of the inflow chamber 3 (specifically, the first chamber 30 forming the inflow chamber 3) and the outflow chamber 4 communicate with each other through an upper space above them and the upper space forms an overflow section 35. The overflow section 35 functions as follows: when a heavy rain or the like causes a large amount of floating solids and oil to temporarily flow along with rainwater into the inflow chamber, the overflow section 35 allows them to overflow into the outflow chamber 4 so as to prevent the inflow chamber 3 from being filled and clogged with the solids and others.

The discharge outlet 7 is provided with the weir 7b and the weir 7b prevents the overflowing floating solids and oil from flowing out through the discharge outlet 7 to the downstream side. The floating solids and oil remaining in the outflow chamber 4 can be taken out and removed from the top by opening the lid 34 on an appropriate occasion.

The partition plate 5 with the screens 8 arranged thereat partitions the inside space of the separation tank 2 into the inflow chamber 3 and the outflow chamber 4 and can be made of corrosion-resistant metal, fiber reinforced plastic, or the like. In the embodiment of FIG. 12, the two parallel main surfaces of the partition plate 5 are composed of a small-width frame and the screens 8 are arranged inside the frame.

For this reason, most of the function to partition the inside space of the separation tank 2 into the inflow chamber 3 and the outflow chamber 4 is played by the screens 8. The partition plate 5 can be configured so that the peripheral part thereof is fixed to the inner wall of the separation tank 2. It is, however, possible to fix two ends of a screen 8 with a plane cross section of U-shape directly to the inner wall of the separation tank 2 and in that case, the screen 8 also serves as the partition plate 5.

The supply part 6 formed at the first chamber 30 is configured to horizontally supply the flowing liquid from the upper part of the first chamber 30. Provided near the partition plate 5 on the other side where the flowing liquid supplied from the supply part 6 moves horizontally in the upper part of the first chamber 30 to collide is the guide 9 for making the moving flowing liquid smoothly descend and thereby smoothly generating the vertical swirling flow in the first chamber 30. The guide 9 can be made of a material, for example, steel, FRP, resin such as polyethylene, concrete, or the like.

The dividing body 32 of plate shape dividing the inflow chamber 3 into the first chamber 30 and the second chamber 31 extends from the side where the supply part 6 is formed, to the opposite side thereto in the inflow chamber 3. When the inflow chamber 3 is divided into the upper and lower chambers as described above, the first chamber 30 and the second chamber 31 are formed with almost the same plane area and a deposition section 36 for solids is formed by making use of the internal space of the second chamber 31. This dividing body 32 can be made of a material, for example, steel, FRP, resin such as polyethylene, concrete, or the like.

The dividing body 32 of the plate shape is horizontally arranged as a whole, and guides 9 upwardly curved in an arcuate shape are formed in respective regions on the side where the supply part 6 is formed and on the opposite side thereto (downstream side). These guides 9 operate in cooperation with the action of the guide 9 provided at the upper part of the first chamber 30, to promote generation of the vertical swirling flow in the first chamber 30.

The screens 8 extend vertically so as to be in contact with the respective edges of the plate-shape dividing body 32 in the width direction, i.e., with the two opposed edges in the direction perpendicular to an axis line connecting the supply part 6 and the opposite side thereto, and their lower edges are in contact with the bottom of the second chamber 31. The opening part 33 for dropping the solids from the first chamber 30 to the second chamber 31 is formed in the center of the guide 9 on the supply part 6 side in the dividing body 32, i.e., in the center between the two edges. The two edges in the width direction of the opening part 33 shown in FIG. 12(*a*) are separated from the two edges in the width direction of the dividing body 32, but, without always having to be limited to this, for example, the two edges in the width direction of the opening part 33 may be made coincident with the two edges in the width direction of the dividing body 32.

The below will describe a method of separating the solids contained in the flowing liquid, by the separator 1 of FIG. 12. The flowing liquid supplied from the supply part 6 into the first chamber 30 moves horizontally as indicated by an arrow in the upper part of the first chamber 30; it then descends while being guided by the guide 9; it is further guided to return horizontally by the guide 9 (the right guide 9 in FIG. 12(*b*)) formed at one end of the dividing body 32; it then passes in the lower part of the first chamber 30 to move to the space below the supply part 6. The flowing liquid having moved to the space below the supply part 6 is guided in the upward direction therefrom by the guide 9 (the left guide 9 in FIG. 12(*b*)) formed at the other end of the dividing body 32. In this manner, the vertical swirling flow is formed in the flowing liquid in the first chamber 30.

On the other hand, part of the flowing liquid vertically swirling in the first chamber 30 flows through the two screens 8 into the outflow chamber 4 and on that occasion, the solids contained in the flowing liquid are captured and separated on the surfaces of the screens 8 without passing therethrough. As long as the flowing liquid is influent from the supply part 6, the vertical swirling flow is generated inside the first chamber 30 and an amount of the flowing liquid equivalent to an inflow amount thereof flows through the screens 8 into the outflow chamber 4.

The vertical swirling flow circulates in the first chamber 30 as described above and, when the swirling flow is regarded as a flux of flow, the top surface of the flux of the swirling flow horizontally flowing from the liquid inlet 6 is guided by the downstream guide 9 to descend, and it becomes the bottom surface during return to the upstream side through the lower part of the first chamber 30. On the other hand, the bottom surface of the flux of the swirling flow flowing horizontally from the liquid inlet 6 is guided by the downstream guide 9 to descend, and it becomes the top surface during the return to the upstream side through the lower part of the first chamber 30. The screens 8 are arranged along the side faces perpendicular to the top and bottom surfaces of the swirling flow as described.

The solids captured and attached on the surfaces of the screens 8 are efficiently peeled off by the vertical swirling flow. The solids such as sand thus peeled off move on the swirling flow, and most of them move (or drop) into the second chamber 31, along with part of the flowing liquid, through the opening part 33 on the way of the movement, to be deposited in the deposition section 36 in the second chamber 31. The flowing liquid influent into the second chamber 31 passes through the screens 8 extending to the second chamber 31, to flow out into the outflow chamber 4.

The screens 8 provided at the partition plate 5 are arranged along the side faces of the vertical swirling flow formed as described above, and part of the swirling flow passes through the screens 8 into the outflow chamber 4.

When the screens 8 used are the wedge wire screens to separate fine solids as well, this configuration increases a rate of circulation of the fine solids on the swirling flow in the first chamber 30. However, an absolute amount of fine solids is small and even if they circulate in the first chamber 30, the separation process can be continued for a long period of time and thus it poses no problem in practical use. On the other hand, the flowing liquid passing through the screens 8 and flowing into the outflow chamber 4 flows through an opening part formed at the bottom of the weir 7b, to the discharge outlet 7 and is discharged therefrom to the downstream pipe.

The upper spaces of the inflow chamber 3 and the outflow chamber 4 communicate with each other through the overflow section 35. As described above, when a large amount of floating solids and oil temporarily flow together with rainwater into the inflow chamber 3, they overflow from the overflow section 35 into the outflow chamber 4 to stay there. The overflowing floating solids and oil are blocked by the weir 7b and thus do not flow out through the discharge outlet 7 to the downstream side.

As the flowing liquid disposal is continued over a long period of time in the separator 1, the amount of solids deposited in the deposition section 36 in the second chamber 31 gradually increases and raises a need for discharging the deposited solids to the outside while suspending the separation process on an appropriate occasion. A discharge method is, for example, an operation to open the lid 34 covering the upper part of the separation tank 2, to insert a suction pipe from the top through the opening part 33 into the second chamber 31, and to pump the deposited solids upward from the deposition section 36 by a suction pump or the like to recover them. Another method is to provide an opening/closing lid in the bottom or the lower part of the side of the second chamber 31, to open the opening/closing lid, and to discharge the deposits to the outside.

Industrial Applicability

The flowing liquid to which the present invention is applicable can include, for example, rainwater and general drainage water flowing from houses, roads, and fields into the sewerage system, factory effluents, restaurant kitchen sewage, sewage from meat-processing plants, industrial water, and so on. The present invention is also applicable to waste oil containing chips and fine particles, e.g., machine oil or cutting oil, waste water containing waste oil, brewery wastes containing alcohol, and so on. In any case, the present invention meets requirements to separate solids from solids-containing flowing liquid, or to separate solids from a mixture containing the solids and flowing liquids of different specific gravities and separate the flowing liquid of the larger specific gravity. Furthermore, for water resource measures and effective use of water resources, it is necessary to remove toxic substances such as hyperfine solids and bacteria and an advanced treatment is carried out by a membrane treatment or the like for that purpose; in order to efficiently perform it, it is desirable to remove the solids in the flowing liquid as many as possible, and the present invention is also applicable to the pretreatment in reuse of such waste water. Therefore, the present invention can be preferably used in separation of solids in each of many industries.

The invention claimed is:

1. A separator, which is a device for separating solids contained in influent liquid, said separator comprising:
   a separation tank;
   a partition plate partitioning an inside space of the separation tank into an inflow chamber and an outflow chamber;
   a screen connected to the partition plate;
   a liquid inlet connected to the inflow chamber;
   a discharge outlet connected to the outflow chamber; and
   guides located in the inflow chamber that form a vertical swirling flow in the inflow chamber by reversing the influent liquid from the liquid inlet, and wherein the screen is disposed along a side face of the swirling flow thus formed,
   wherein the separation tank is formed with a plane cross section of a rectangular shape having a longitudinal axis and a transverse axis, and
   wherein the partition plate is disposed so as to be parallel to the longitudinal axis, wherein the liquid inlet at the inflow chamber is formed at one longitudinal end of the separation tank, and wherein the discharge outlet at the outflow chamber is formed at the other longitudinal end of the separation tank.

2. The separator according to claim 1, wherein the screen comprises two screens, and the screens are provided so that they are parallel to each other or so that a distance between them decreases with distance from the liquid inlet.

3. The separator according to claim 1, wherein the screen is composed of a wedge wire screen in which a plurality of wedge wires with a wedge-shaped cross section are arranged in a vertical direction, and a part of an inner surface of the inflow chamber is composed of heads of the respective wedge wires.

4. The separator according to claim 3, wherein axis lines extending from the heads of the respective wedge wires toward distal ends thereof are inclined toward a downstream side of the formed vertical swirling flow, and the axis lines are inclined in opposite directions to each other according to upper and lower flows of the vertical swirling flow.

5. The separator according to claim 1, wherein a solid discharge outlet is provided at a bottom of the inflow chamber.

6. The separator according to claim 1, wherein a drain outlet is provided at a bottom of the outflow chamber.

7. The separator according to claim 1, wherein the liquid inlet is formed at an upper portion of the inflow chamber, one guide of the guides is provided at a portion where the swirling flow ascends from a lower portion in the inflow chamber toward the liquid inlet, and a gap is provided between an end of the one guide and a peripheral wall on which the swirling flow ascends.

8. The separator according to claim 1, wherein an overflow section to establish communication between the inflow chamber and the outflow chamber is provided at an upper portion of the partition plate, and the discharge outlet is provided with a weir to prevent oil or floating solids from flowing thereinto.

\* \* \* \* \*